United States Patent
Perras et al.

(10) Patent No.: US 12,526,737 B2
(45) Date of Patent: Jan. 13, 2026

(54) RELAY DISCOVERY AND SELECTION

(71) Applicant: InterDigital Patent Holdings, Inc., Wilmington, DE (US)

(72) Inventors: Michelle Perras, Montreal (CA); Xiaoyan Shi, Lake Oswego, OR (US); Alec Brusilovsky, Downingtown, PA (US); Samir Ferdi, Kirkland (CA); Behrouz Aghili, Commack, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 273 days.

(21) Appl. No.: 18/029,081

(22) PCT Filed: Oct. 1, 2021

(86) PCT No.: PCT/US2021/053085
§ 371 (c)(1),
(2) Date: Mar. 28, 2023

(87) PCT Pub. No.: WO2022/072775
PCT Pub. Date: Apr. 7, 2022

(65) Prior Publication Data
US 2023/0413171 A1    Dec. 21, 2023

Related U.S. Application Data

(60) Provisional application No. 63/086,326, filed on Oct. 1, 2020.

(51) Int. Cl.
*H04W 48/20* (2009.01)
*H04W 76/14* (2018.01)
*H04W 92/18* (2009.01)

(52) U.S. Cl.
CPC ........... *H04W 48/20* (2013.01); *H04W 76/14* (2018.02); *H04W 92/18* (2013.01)

(58) Field of Classification Search
CPC ...... H04W 48/20; H04W 76/14; H04W 92/18
See application file for complete search history.

(56) References Cited

U.S. PATENT DOCUMENTS

| 10,531,365 B2 * | 1/2020 | Kaur ............... H04W 48/10 |
| 10,609,744 B2 * | 3/2020 | Kim ............... H04W 40/04 |

(Continued)

FOREIGN PATENT DOCUMENTS

| EP | 3461151 A1 | 3/2019 |
| WO | 2016/164808 A1 | 10/2016 |

OTHER PUBLICATIONS

3rd Generation Partnership Project (3GPP), Ts 23.303 V16.0.0, "Technical Specification Group Services and System Aspects, Proximity-Based Services (ProSe), Stage 2 (Release 16)", Jul. 2020, pp. 1-130.

*Primary Examiner* — Dhaval V Patel
(74) *Attorney, Agent, or Firm* — CONDO ROCCIA KOPTIW LLP

(57) ABSTRACT

A wireless transmit-receive unit (WTRU) may be provided. The WTRU may be configured to receive a first message from a first relay WTRU. The first message may indicate a service provided by a second WTRU and a first measurement associated with a broadcast message. The WTRU may be configured to determine a second measurement. The second measurement may be associated with the first message received from the first relay WTRU. The WTRU may be configured to send a second message to the first relay WTRU if the first measurement satisfies a first criteria for selecting a relay from a plurality of relays and the second measurement satisfies a second criteria for selecting the relay from the plurality of relays. The second message may comprise an indication to establish communication between the first WTRU and the second WTRU via the first relay WTRU.

30 Claims, 15 Drawing Sheets

(56) References Cited

U.S. PATENT DOCUMENTS

| | | | |
|---|---|---|---|
| 11,019,543 B2* | 5/2021 | Kumar | H04W 36/026 |
| 11,665,730 B2* | 5/2023 | Ahmad | H04W 72/56 370/329 |
| 2017/0244468 A1 | 8/2017 | Zhao | |
| 2018/0317268 A1 | 11/2018 | Kim et al. | |
| 2019/0394816 A1* | 12/2019 | Kim | H04W 76/10 |
| 2022/0060954 A1* | 2/2022 | Xu | H04W 12/06 |

* cited by examiner

RELAY DISCOVERY AND SELECTION

CROSS-REFERENCE TO RELATED APPLICATIONS

This application is the National Stage Entry under 35 U.S.C. § 371 of Patent Cooperation Treaty Application No. PCT/US2021/053085, filed Oct. 1, 2021, which claims the benefit of U.S. Provisional Patent Application No. 63/086,326, filed Oct. 1, 2020, the contents of which are hereby incorporated by reference herein.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE). Wireless communication devices may establish communications with other devices and data networks, for example, via an access network, such as a radio access network (RAN).

SUMMARY

Systems, methods, and instrumentalities are disclosed herein that are associated with relay discovery and selection. A first wireless transmit-receive unit (WTRU) and/or a method performed by the first WTRU may be provided. The WTRU may comprise a processor. The processor may be configured to perform a number of actions. A first message may be received from a first relay WTRU. The first message may indicate a service provided by a second WTRU and a first measurement associated with a broadcast message sent by the second WTRU and received by the first relay WTRU. A second measurement may be determined. The second measurement may be associated with the first message received from the first relay WTRU. A second message may be sent to the first relay WTRU if the first measurement satisfies a first criteria for selecting a relay from a plurality of relays and the second measurement satisfies a second criteria for selecting the relay from the plurality of relays. The second message may comprise an indication to establish communication between the first WTRU and the second WTRU via the first relay WTRU.

A first WTRU and/or a method performed by the first WTRU may be provided. the WTRU comprise a processor. The processor may be configured to perform a number of actions. A first message may be received from a first relay WTRU. The first message may indicate a service provided by a second WTRU and a combined measurement associated with a first measurement and a second measurement. The first measurement may be determined by the first relay WTRU. The second measurement may be determined by a second relay WTRU. A third measurement may be determined. The third measurement may be associated with the first message received from the first relay WTRU. A second message may be sent to the first relay WTRU if the combined measurement satisfies a first criteria for selecting a relay from a plurality of relays and the third measurement satisfies a second a criteria for selecting the relay from the plurality of relays. The second message may comprise an indication to receive data from the second WTRU via the first relay WTRU.

Systems, methods, and instrumentalities are disclosed herein that are associated with relay discovery and selection. A link measurement between a service providing (SP)-wireless transmit/receive unit (WTRU) and a WTRU-to-WTRU relay may be indicated in discovery message (e.g., in a direct communication request (DCR) or discovery, or in a domain name system (DNS) response) that may be sent from a relay to a service utilizing (SU)-WTRU. A remote WTRU may send a link measurement (e.g., a PC5 link measurement, a Uu measurement, and/or the like) to a RAN (e.g., for a handover (HO)). A DCR-based discovery mechanism (e.g., for direct communication or via a WTRU-to-WTRU relay) may support one or more model type discoveries, such as Model B type discovery. A Model B type discovery may be where a WTRU may determine what devices may be available. A Model A type discovery may be where a WTRU may announce itself on a network such that it may be discovered by other devices. An SU-WTRU may send a DCR with a requested service. An SP-WTRU may reply, for example, by sending a DCR with a provided service. A remote WTRU and/or an SU-WTRU may specify a requested service and/or a requested indicator (e.g., a key performance indicator (KPI)), for example, if triggering a discovery mechanism. A network relay, a SP-WTRU, and/or a WTRU-to-WTRU relay that supports the requested service and/or KPI may reply to the discovery request. Model B type discovery may be supported with a WTRU-to-WTRU relay, for example, using a discovery message, code, and/or filter (e.g., received from the network). A network relay may provide a Uu interface link quality indication to a remote WTRU. A network relay may provide (e.g., forward) an algorithm, a function, and/or an artificial intelligence (AI)/machine learning (ML) model, for example, to assist with relay WTRU selection at a remote WTRU. A relay WTRU may send a combined link measurement. The combined link measurement may be a combined PC5 link measurement. The combined link measurement may be, a measurement received from a WTRU-to-WTRU relay combined with its observed PC5 link measurement(s) obtained on the link where the discovery or DCR message(s) are received. A relay WTRU may use a connectivity matrix and may derive a value from them, for example, for example, to make a relay selection decision. A relay WTRU and/or a remote WTRU may use cooperative ML, for example, to make a relay selection decision.

DETAILED DESCRIPTION

Systems, methods, and instrumentalities are disclosed herein that are associated with relay discovery and selection. A link measurement between a service providing (SP)-wireless transmit/receive unit (WTRU) and a WTRU-to-WTRU relay may be indicated in discovery message (e.g., in a direct communication request (DCR) or discovery, or in a domain name system (DNS) response) that may be sent from a relay to a service utilizing (SU)-WTRU. A remote WTRU may send a link measurement (e.g., a PC5 link measurement, a Uu measurement, and/or the like) to a RAN (e.g., for a handover (HO)). A DCR-based discovery mechanism (e.g., for direct communication or via a WTRU-to-WTRU relay) may support one or more model type discoveries, such as Model B type discovery. A Model B type discovery may be where a WTRU may determine what devices may be available. A Model A type discovery may be where a WTRU may announce itself on a network such that it may be discovered by other devices. An SU-WTRU may send a DCR with a requested service. An SP-WTRU may reply, for example, by sending a DCR with a provided service. A remote WTRU and/or an SU-WTRU may specify a requested service and/or a requested indicator (e.g., a key performance indicator (KPI)), for example, if triggering a discovery mechanism. A network relay, a SP-WTRU, and/or a WTRU-to-WTRU relay that supports the requested service and/or KPI may reply to the discovery request. Model B type discovery may be supported with a WTRU-to-WTRU relay, for example, using a discovery message, code, and/or filter (e.g., received from the network). A network relay may provide a Uu interface link quality indication to a remote WTRU. A network relay may provide (e.g., forward) an algorithm, a function, and/or an artificial intelligence (AI)/machine learning (ML) model, for example, to assist with relay WTRU selection at a remote WTRU. A relay WTRU may send a combined link measurement. The combined link measurement may be a combined PC5 link measurement. The combined link measurement may be, a measurement received from a WTRU-to-WTRU relay combined with its observed PC5 link measurement(s) obtained on the link where the discovery or DCR message(s) are received. A relay WTRU may use a connectivity matrix and may derive a value from them, for example, for example, to make a relay selection decision. A relay WTRU and/or a remote WTRU may use cooperative ML, for example, to make a relay selection decision.

Figure 1A:
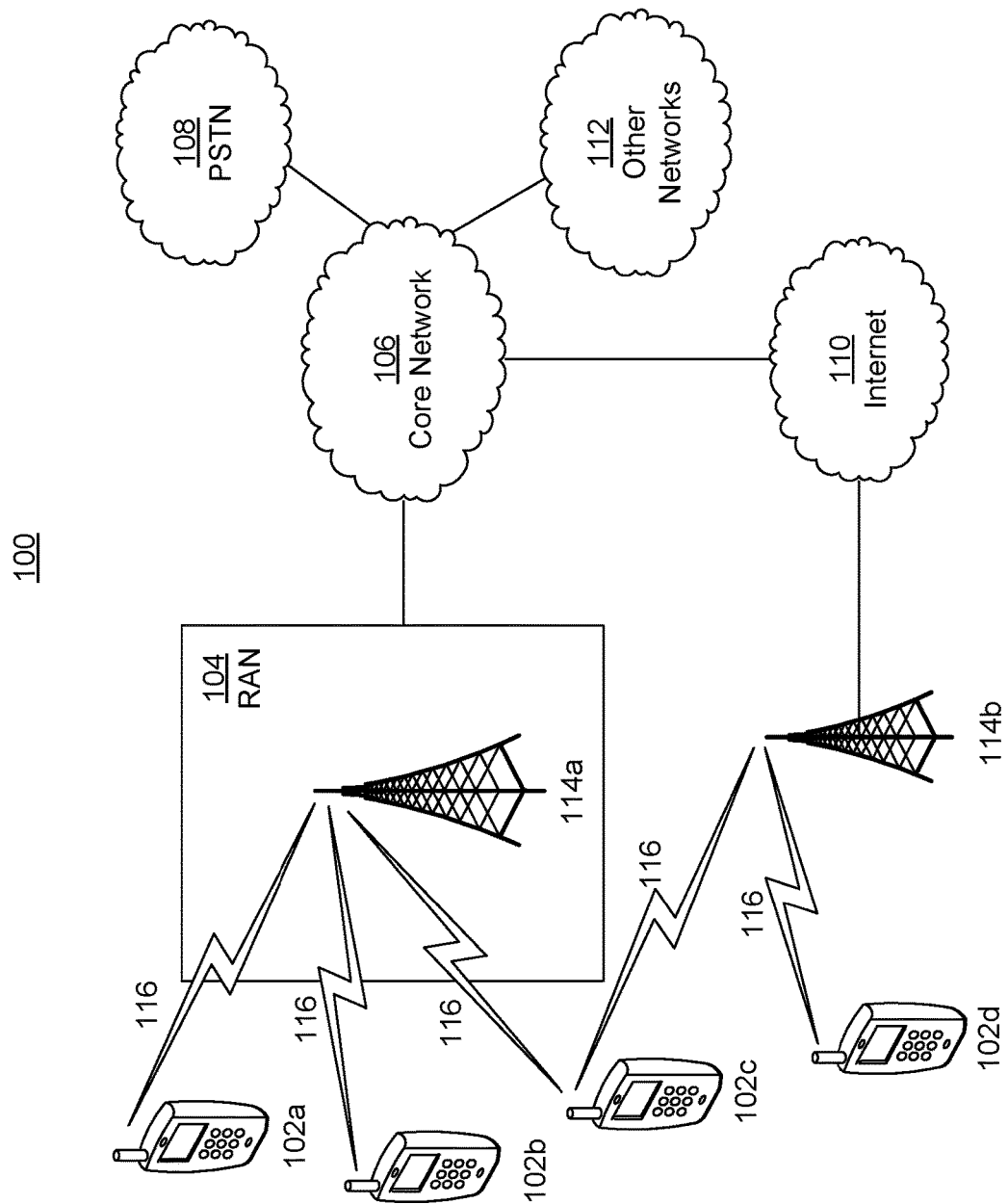
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b. 102c, 102d to facilitate access to one or more communication networks, such as the CN 106/115, the Internet 110, and/or the other networks 112. By way of example, the base stations 114a, 114b may be a base transceiver station (BTS), a Node-B, an encode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 1041113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b. 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B. or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
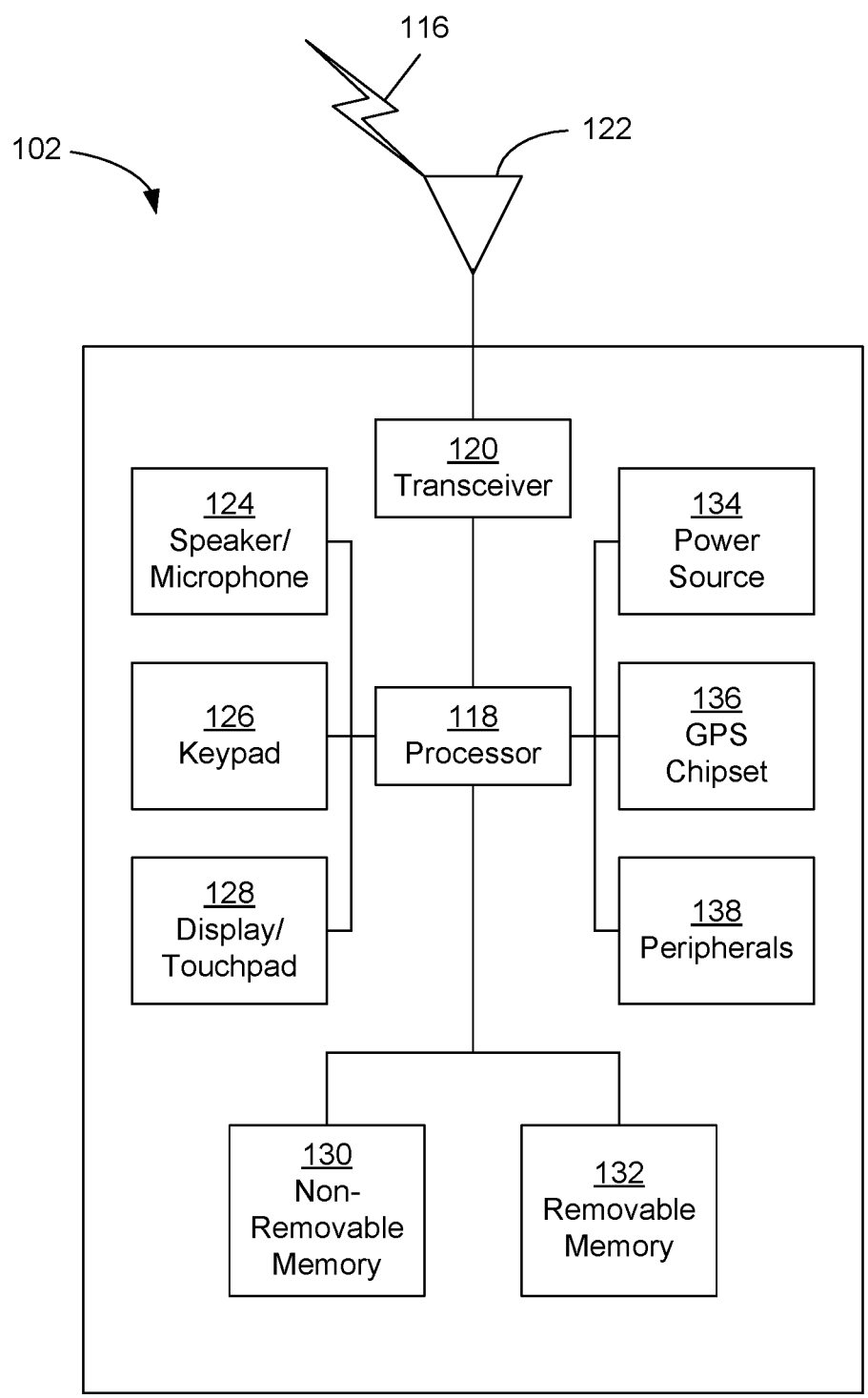
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, alight sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
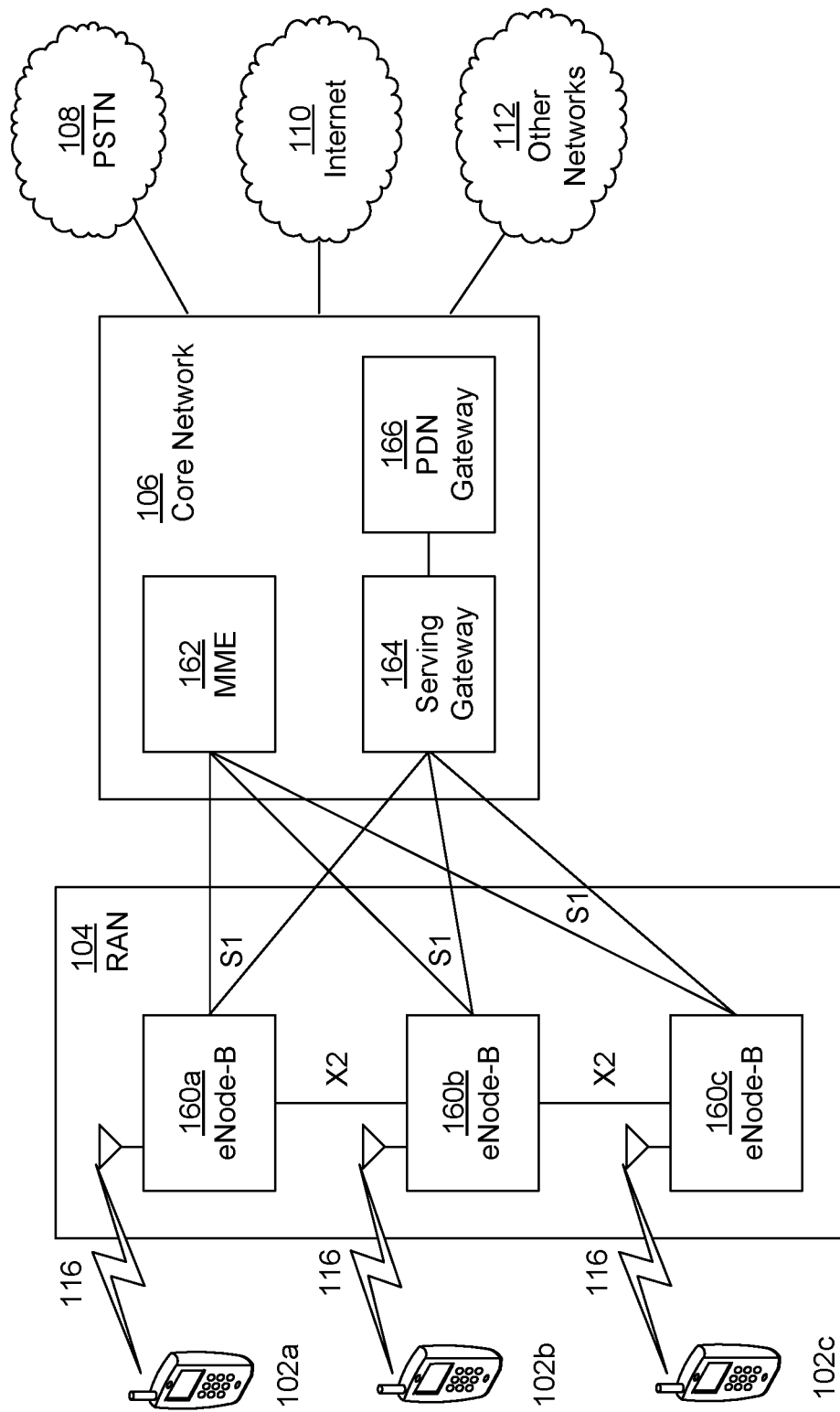
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e LS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
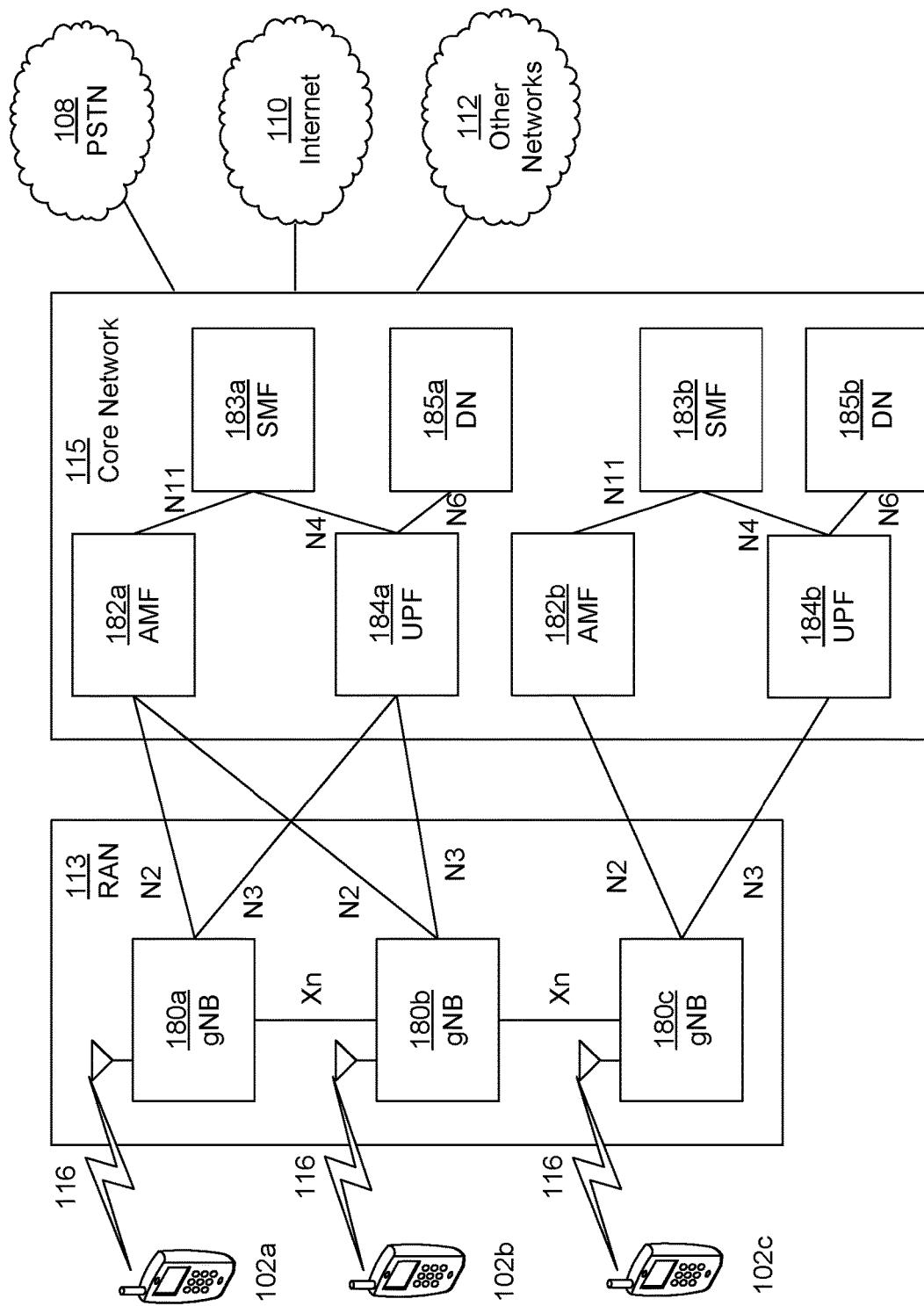
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b. 180c using signals in an unlicensed band. In a non-standalone configuration WTRUs 102a, 102b, 102c may communicate with/connect to gNBs 180a, 180b. 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b. 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment Direct RF coupling and/or wireless communications via RF circuitry (e.g., which may include one or more antennas) may be used by the emulation devices to transmit and/or receive data.

Systems, methods, and instrumentalities are disclosed herein that are associated with relay discovery and selection. A link measurement between a service providing (SP)-wireless transmit/receive unit (WTRU) and a WTRU-to-WTRU relay may be indicated in discovery message (e.g., in a direct communication request (DCR) or discovery, or in a domain name system (DNS) response) that may be sent from a relay to a service utilizing (SU)-WTRU. A remote WTRU may send a link measurement (e.g., a PC5 link measurement, a Uu measurement, and/or the like) to a RAN (e.g., for a handover (HO)). A DCR-based discovery mechanism (e.g., for direct communication or via a WTRU-to-WTRU relay) may support one or more model type discoveries, such as Model B type discovery. A Model B type discovery may be where a WTRU may determine what devices may be available. A Model A type discovery may be where a WTRU may announce itself on a network such that it may be discovered by other devices. An SU-WTRU may send a DCR with a requested service. An SP-WTRU may reply, for example, by sending a DCR with a provided service. A remote WTRU and/or an SU-WTRU may specify a requested service and/or a requested indicator (e.g., a key performance indicator (KPI)), for example, if triggering a discovery mechanism. A network relay, a SP-WTRU, and/or a WTRU-to-WTRU relay that supports the requested service and/or KPI may reply to the discovery request. Model B type discovery may be supported with a WTRU-to-WTRU relay, for example, using a discovery message, code, and/or filter (e.g., received from the network). A network relay may provide a Uu interface link quality indication to a remote WTRU. A network relay may provide (e.g., forward) an algorithm, a function, and/or an artificial intelligence (AI)/machine learning (ML) model, for example, to assist with relay WTRU selection at a remote WTRU. A relay WTRU may send a combined link measurement. The combined link measurement may be a combined PC5 link measurement. The combined link measurement may be, a measurement received from a WTRU-to-WTRU relay combined with its observed PC5 link measurement(s) obtained on the link where the discovery or DCR message(s) are received. A relay WTRU may use a connectivity matrix and may derive a value from them, for example, for example, to make a relay selection decision. A relay WTRU and/or a remote WTRU may use cooperative ML, for example, to make a relay selection decision.

There may be multiple types or models of service discovery. A first model for service discovery (e.g., direct service discovery), which may be referred to as Model A or Open Direct Discovery, may be based on an announcement (e.g., a declaration, such as "I am here"). Service-enabled (e.g., ProSe-enabled) WTRUs may include, for example, an announcing WTRU and a monitoring WTRU. ProSe-enabled WTRUs (e.g., ProSe-enabled WTRUs that are participating in ProSe direct discovery) may have one or more roles. A first role for such WTRUs may be to operate as an announcing WTRU, which may include announcing certain information that may be used by WTRU(s) in proximity, such as by WTRU(s) that have permission to discover other devices. A second role for such WTRUs may be to operate as a monitoring WTRU, which may include monitoring certain information of interest (e.g., while in proximity to one or more announcing WTRUs). An announcing WTRU may broadcast discovery messages at predefined discovery intervals. Monitoring WTRUs (e.g., monitoring WTRUs that are interested in the broadcast messages) may read and process the broadcast messages they receive. An announcement/declaration in Model A may be equivalent to an "I am here" paradigm, for example, if the announcing WTRU broadcasts information about itself (e.g., a ProSe application identity and/or a ProSe WTRU identity) in the discovery message.

A second model for (e.g., direct) service discovery (e.g., direct service discovery), which may be referred to as "Model B," may be based on a request (e.g., seeking a response, such as asking "who is there?" or "are you there?"). Service-enabled (e.g., ProSe-enabled) WTRUs (e.g., service-enabled WTRUs that may participate in ProSe direct discovery) may have one or more (e.g., two) roles. A first role for such WTRUs may be to operate as a discoverer WTRU, which may transmit a request. The request may include information about what the discoverer WTRU (e.g., an application executing therein) may be interested in discovering or may seek to discover, for example, from one or more WTRUs in proximity. A second role such WTRUs may be to operate as a discoveree WTRU, which may receive a request message from one or more discoverer WTRUs, and may respond, for example, with information that may be related to a discoverer's request.

Figure 2:
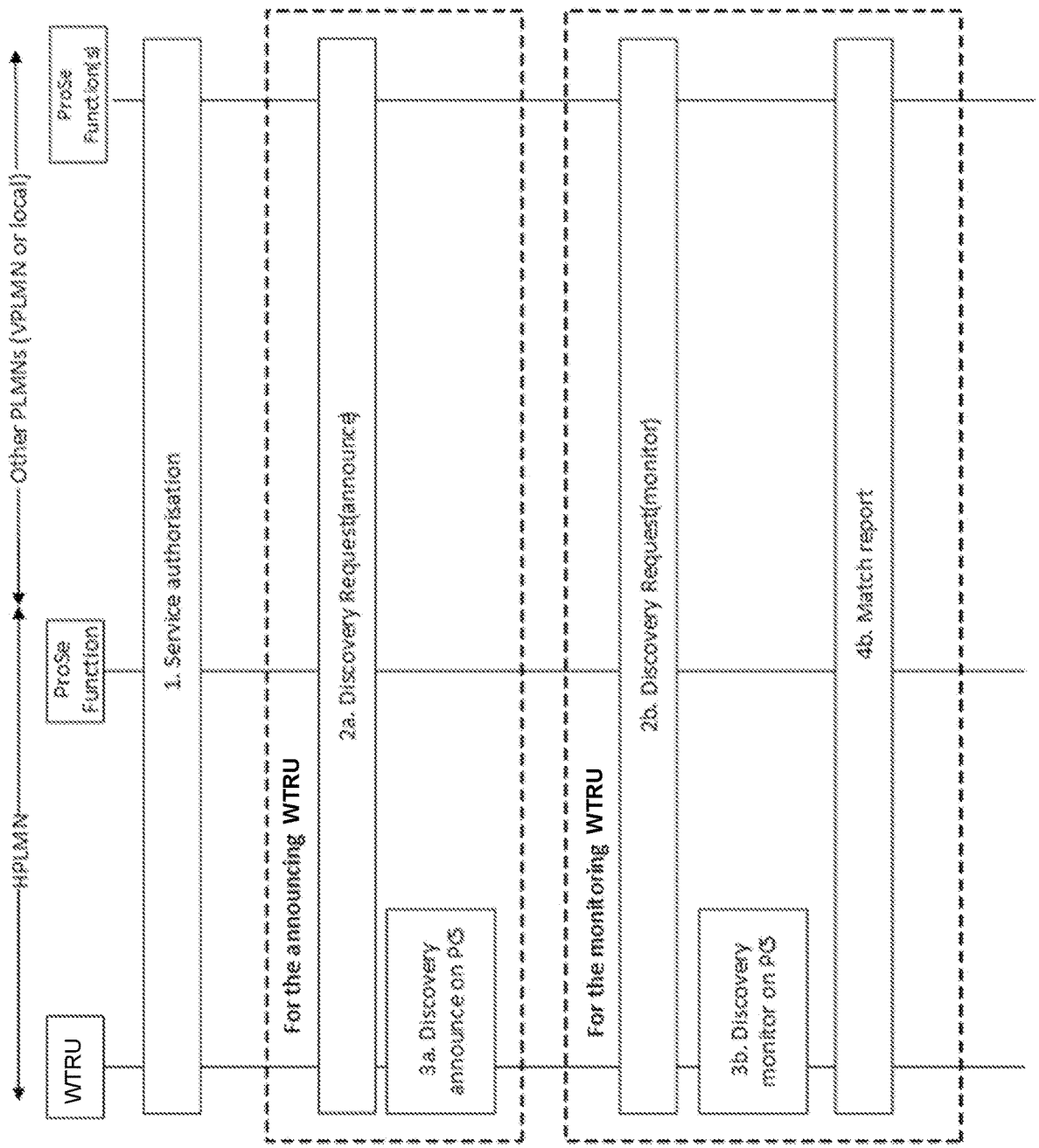
FIG. 2 illustrates an example of direct service discovery.

FIG. 2 depicts an example implementation for direct service discovery. The example shown in FIG. 2 may be consistent with Model A. Referring to FIG. 2, at 1, a WTRU may obtain authorization from a ProSe function to announce and/or monitor in a particular public land mobile network (PLMN).

At 2a, the WTRU may send a discovery announce request to the ProSe function, for example, if the WTRU is authorized to announce. The request may identify a service that the WTRU determined to advertise. Identification of a service may be provided, for example, by a ProSe application ID. The ProSe function may provide a ProSe application code for the WTRU to announce.

At 2b, the WTRU may send a discovery monitor request to the ProSe function. The request may include a service that the WTRU is requesting to discover/monitor (e.g., using a ProSe application ID). The ProSe function may provide to the WTRU a ProSe application code to monitor.

A WTRU may communicate with a second WTRU via a WTRU-to-WTRU relay (e.g., a relay WTRU). For example, proximity services (ProSe) may include WTRU to WTRU communication via a relay WTRU (e.g., in a 5G network). A WTRU may discover the second WTRU, for example, using Model A, Model B, or another discovery procedure or mechanism. A WTRU may communicate with the discovered second WTRU, for example, via a WTRU-to-WTRU relay between the WTRUs (e.g., located communicatively between the WTRUs).

Figure 3:
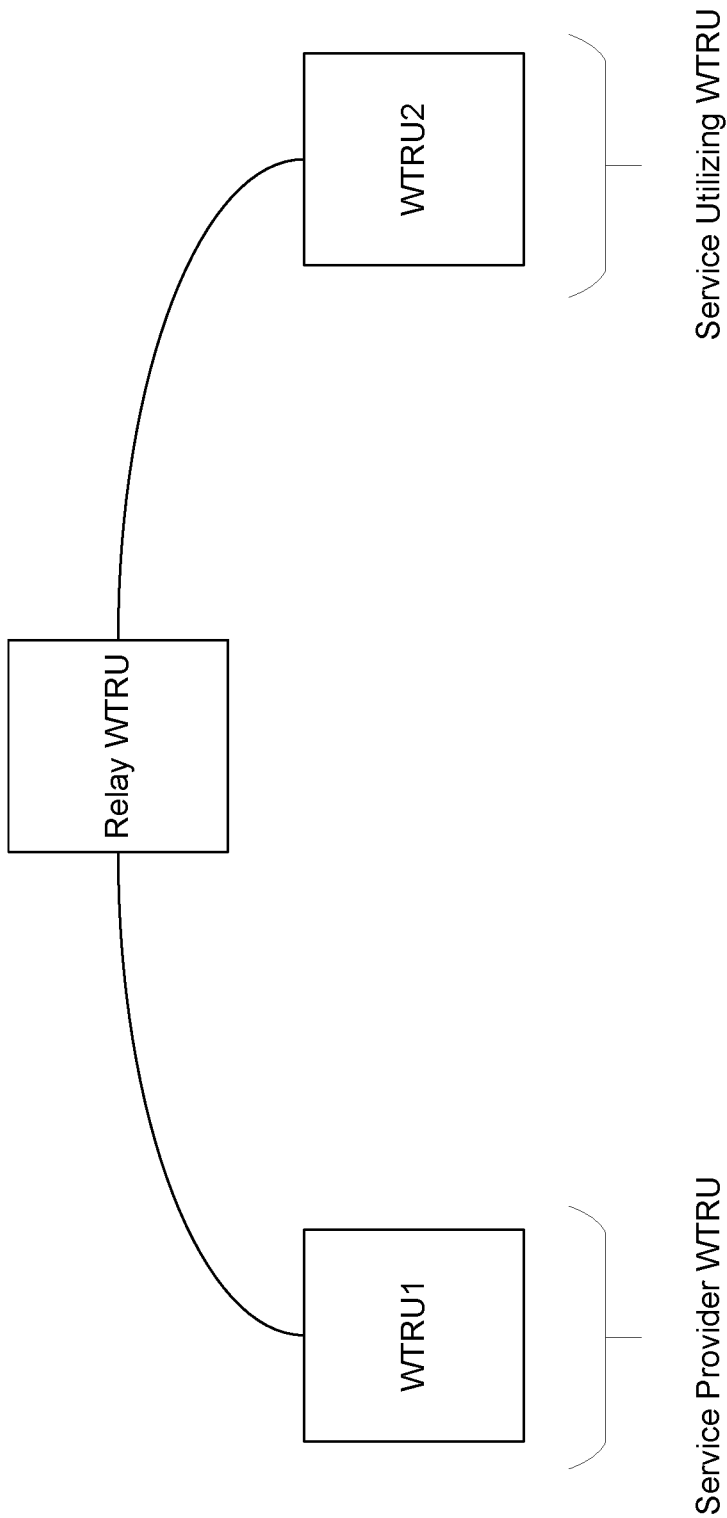
FIG. 3 illustrates an example of WTRU to WTRU communication via a Relay WTRU.

FIG. 3 depicts an example of WTRU to WTRU communication via a relay WTRU. FIG. 3 shows three types of WTRUs. A service provider WTRU (WTRU1) may offer a service that may be discoverable by other WTRUs (e.g., by searching for one or more available services). Examples of services that may be provided by a service provider WTRU may include restaurant service, taxi service, gaming console, gaming controller, and/or the like.

A service utilizing WTRU (WTRU2) may search for one or more available services, which may include the services offered by the service provider WTRU. There may be more than one service utilizing WTRU. Service utilizing WTRU(s) may attempt to discover available services, which may include services provided by one or more service provider WTRU (e.g., a particular service provider WTRU). Examples of a service utilizing WTRU may include a WTRU that provides one or more application(s) (e.g., apps) that may be used by a restaurant customer or a taxi passenger, a WTRU that provides a gaming controller for a user, an augmented reality (AR) and/or virtual reality (VR) headset that may be used by a user, etc.

A relay WTRU may assist and/or relay discovery message(s) and data communication (e.g., PC5 data communication) between a service provider WTRU and a service utilizing WTRU. A relay WTRU may, for example, act as a proxy between the service providing and utilizing WTRUs for discovery and/or communication. A relay WTRU may relay (e.g., transparently) the messages between the service providing and utilizing WTRUs. A relay WTRU may be involved in a discovery process between a service provider WTRU and a service utilizing WTRU (e.g., for the service provider WTRU and the service utilizing WTRU).

A direct communication request may be used as a discovery message (e.g., as an enhanced vehicle to everything (eV2X)-based discovery mechanism).

Figure 4:
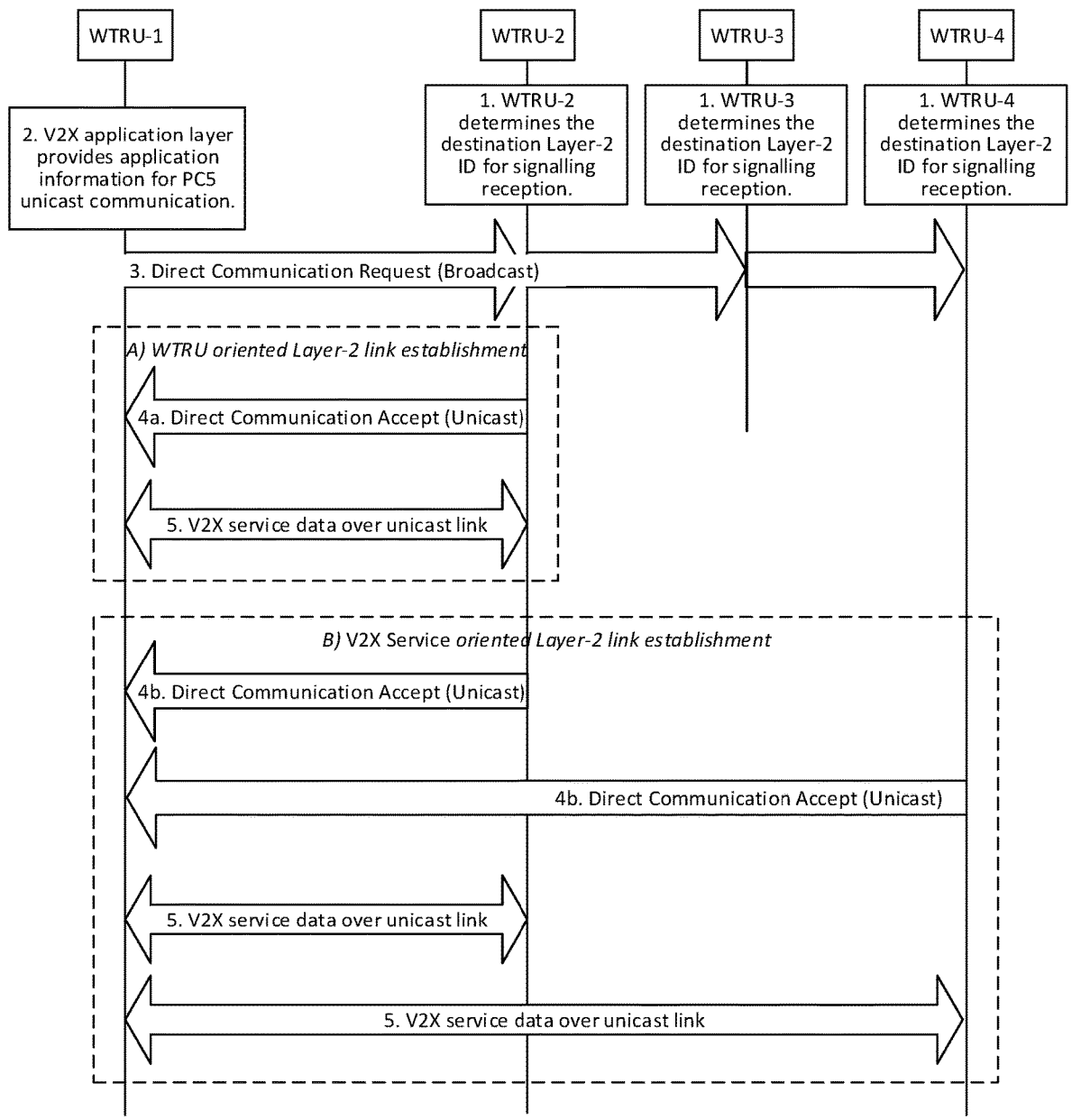
FIG. 4 illustrates an example of a link establishment.

FIG. 4 illustrates an example of a link establishment procedure. FIG. 4 shows an example of a Layer-2 (L2) link establishment procedure (e.g., over PC5 reference point). A link establishment procedure may be performed in multiple ways (e.g., WTRU-oriented or V2X service-oriented).

A link establishment procedure may be WTRU-oriented. An initiating WTRU (e.g., WTRU-1 shown in FIG. 4) may broadcast a direct communication request (DCR) message, which may include one or more provided services (e.g., V2X services), an upper layer identifier of a peer WTRU, and/or a source L2 identifier (ID) of the initiating WTRU. A peer WTRU (e.g., WTRU-2 shown in FIG. 4) may (or may determine to) reply to the request, for example, with a direct communication accept (DCA) message (e.g., a unicast DCA message). A DCA message may use the peer WTRU's L2 ID as the source L2 ID and the initiating WTRU L2 ID as the destination L2 ID. A WTRU-oriented establishment procedure may be comparable to Model B (e.g., an "Are you there?" paradigm).

A link establishment procedure may be V2X service-oriented. An initiating WTRU may broadcast a DCR message announcing the initiating WTRU's supported V2X service(s) (e.g., provided V2X service(s)). One or more WTRUs (e.g., all WTRUs) that receive the message may be interested in the announced V2X service(s). The one or more WTRUs may reply with a DCA message (e.g., a unicast DCA message), for example, to establish a communication (e.g., a PC5 unicast communication), which may assume that authentication/security establishment is successful. An interested WTRU (e.g., WTRU-2 and WTRU-4 shown in FIG. 4) may use the interested WTRU's L2 ID as the source L2 ID and the initiating WTRU L2 ID as the destination L2 ID in a message. A V2X service-oriented link establishment procedure may be comparable to Model A (e.g., an "I am here" paradigm).

A procedure (e.g., an eV2X procedure) may use a direct discovery mechanism (e.g., a lightweight direct discovery mechanism that may use (e.g., may be requested to use) less messaging), which may be integrated with a link establishment procedure. Peer WTRUs may detect (or be able/ enabled/configured to detect) a service broadcast message, for example, without requesting (e.g., first requesting) ProSe codes/filter (e.g., from a network server), which may be referred to as a server-less or a distributed procedure.

Figure 5:
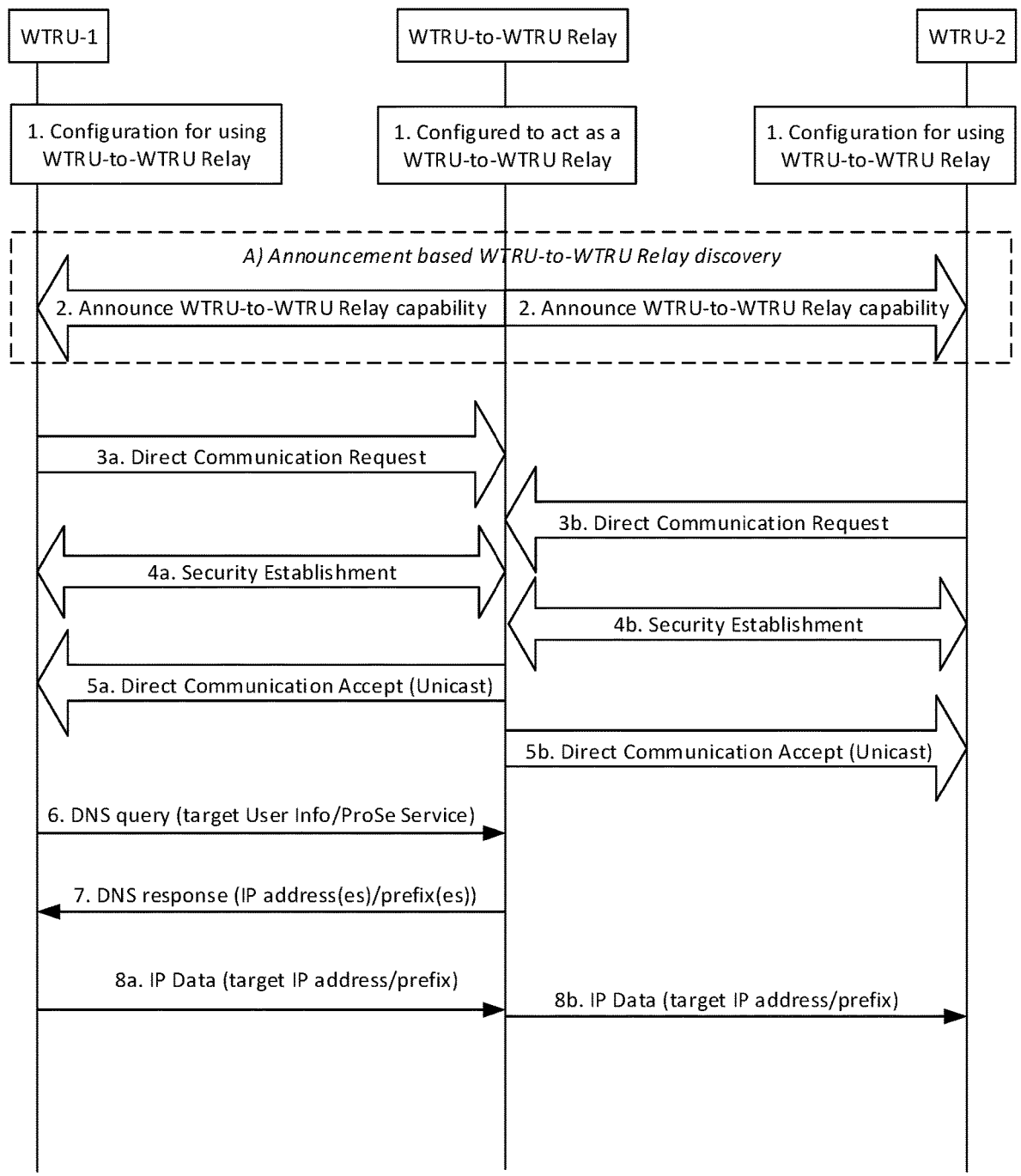
FIG. 5 illustrates an example of a domain name system (DNS) based discovery.

A discovery procedure may be domain name system (DNS)-based. FIG. 5 illustrates an example of a DNS (e.g., a Layer-3 or L3 DNS) based discovery procedure. FIG. 5 shows an example of WTRU-to-WTRU relay operation. A WTRU-to-WTRU relay (e.g., a relay WTRU) may advertise (e.g., periodically) supported services, listen for (e.g., periodically), and/or receive (e.g., periodically) DCR messages from surrounding WTRUs. A service providing (SP)-WTRU and a service utilizing (SU)-WTRU may establish a link (e.g., a unicast link) with at least one WTRU-to-WTRU relay that supports the supported/active services (e.g., each or every WTRU-to-WTRU relay that supports the supported/active services). A (e.g., each) WTRU-to-WTRU relay may track (e.g., may keep track of) information (e.g., in a mapping table) pertaining to one or more SP-WTRUs and/or one or more SU-WTRUs, such as one or more of IP address, corresponding user identifier, and/or supported services. Information may be maintained, for example, in a mapping table. An SU-WTRU (e.g., an SU-WTRU that intends to communicate with an SP-WTRU, or that intends to obtain a specific service) may send a DNS query message to one or more WTRU-to-WTRU relays (e.g., over one or more PC5 unicast links). A DNS query message may include the SP-WTRU's user information and/or the desired service. A WTRU-to-WTRU relay may receive a DNS query message. In response to receiving a DNS query message, a WTRU-to-WTRU relay may look at a mapping table, and reply with information. The information may be the mapping SP-WTRU's IP address or the IP address(es) of one or more (e.g., all) SP-WTRUs that support the specified services (e.g., if user information was not specified in the request). An SU-WTRU and an SP-WTRU may communicate (e.g., in response), for example, by exchanging internet protocol (IP) packets, which may be sent to the WTRU-to-WTRU relay (e.g., over a PC5 unicast link) and forwarded (e.g., over another PC5 unicast link) by the WTRU-to-WTRU relay to the SP-WTRU or SU-WTRU (e.g., based on the destination IP address). The WTRU-to-WTRU relay may act/operate as an IP router.

Figure 6:
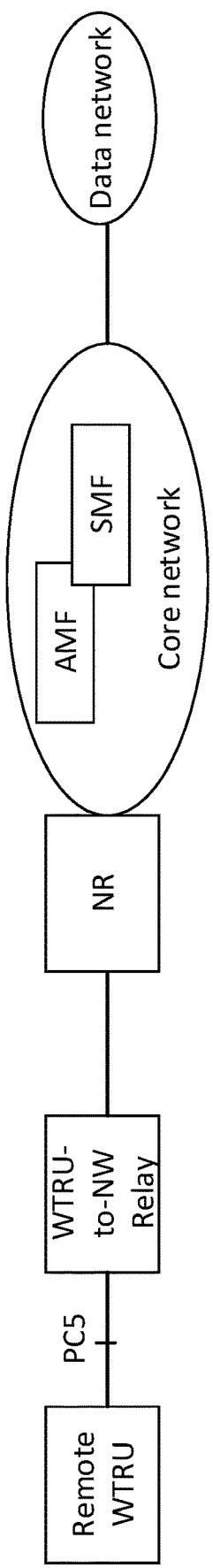
FIG. 6 illustrates an example of an architecture model using a ProSe network relay.

FIG. 6 illustrates an example of a system architecture model using a ProSe network relay. A ProSe network relay entity may provide a functionality to support connectivity to a network for remote WTRUs. A remote WTRU may be out of network coverage (e.g., NR coverage), may be unable to communicate (e.g., directly) with the core network, or may be in network coverage (e.g., NR coverage) but may prefer to use PC5 for communication (e.g., based on a configuration and/or user selection). A remote WTRU may discover and select (e.g., out of multiple discovered choices) a ProSe network relay. A remote WTRU may establish a PC5 session with a selected ProSe network relay. A selected ProSe network relay may forward data and signaling, for example, between the remote WTRU and the network.

WTRU to WTRU discovery via a WTRU-to-WTRU relay (e.g., using Model B discovery) may be supported. Discovery of a peer WTRU via a WTRU-to-WTRU relay may use a "Are you there?" or "Who is there?" mechanism (e.g., Model A and/or Model B). Direct discovery may be based on code(s) received from the network. Discovery of a peer WTRU via a WTRU-to-WTRU relay may use direct discovery. A discoverer WTRU may discover a discoveree WTRU via a WTRU-to-WTRU relay (e.g., using a Model B discovery mechanism), for example, using codes and filters provided by the network.

A direct discovery mechanism (e.g., a lightweight direct discovery mechanism) may be integrated with the link establishment procedure. A direct discovery mechanism may cover the Model A "I am here," Model B "Are you there?," and/or Model B "Who is there?" discovery models. The Model B "Are you there?" discover model may be based on knowledge of a target WTRU's user info, which may not be known with the Model B "Who is there?" discovery model. The Model A "I am here" discovery model may broadcast the supported services and interested WTRUs may reply by completing the establishment of the PC5 unicast link. An SU-WTRU may not want to (e.g., may not determine or may not be configured to) establish PC5 unicast links with multiple SP-WTRUs. An SU-WTRU may want to (e.g., may determine or may be configured to) discover one or multiple SP-WTRUs prior to establishing a PC5 unicast link with one or more of the discovered SP-WTRUs. A Model B "Who is there?" discovery mechanism may be supported, for example, using a DCR as the discovery mechanism.

WTRUs may establish a PC5 unicast link and may communicate via a WTRU-to-WTRU Relay, which may forward the messages between the peer WTRUs. Multiple (e.g., many) relays may be available, e.g. in the vicinity of the peer WTRUs, for message forwarding. A relay selection may be performed for a WTRU (e.g., each WTRU). An SU-WTRU may select a relay, for example, based on one or more criteria (e.g., link quality). Link quality may be determined (e.g., by a WTRU) based on link measurements, which may be acquired/obtained by monitoring a link (e.g., messages sent by a relay).

In some situations, a relay may be located close to an SP-WTRU and far away from an SU-WTRU, which may lead to the SU-WTRU detecting bad link quality. In some situations, a relay may be close to an SU-WTRU and far away from an SP-WTRU, which may lead to the SU-WTRU detecting good link quality. An SU-WTRU that detects good link quality with a relay may select the relay, even though the link quality may be bad between the SP-WTRU and the relay (e.g., if the SU-WTRU is not aware of the link quality between the SP-WTRU and the relay). In some situations, a relay may be located at a reasonable distance from an SP-WTRU and an SU-WTRU, which may be the best relay to select to relay communication between an SP-WTRU and an SU-WTRU. An SU-WTRU may be made aware of the link quality between the SP-WTRU and the WTRU-to-WTRU relay, for example, to improve the SU-WTRU's relay selection (e.g., compatibility with SP-WTRU and the SU-WTRU).

A remote WTRU may use a network relay to access a network. A remote WTRU may be located close to a network relay and may detect a good link quality while the network relay may experience bad link quality to the network. A better network relay selection may be made, for example, based on awareness of the link quality between the network relay and the network. A remote WTRU may be aware of the link quality between a network relay and a network and/or may determine that discovered relays meet one or more minimum thresholds for link quality.

A network may determine to switch a remote WTRU to a network relay (e.g., a new network relay), for example, based on or due to the mobility of a remote WTRU. The network may determine a handover, for example, based on a link quality between a network relay (e.g., a candidate network relay) and the network. The network may be aware of the link quality between the candidate network relay and the network for a handover decision (e.g., if a remote WTRU moves to a network relay (e.g., a new network relay)).

Discovery messages may be referred to herein (e.g., as a generic term) to refer to messages used to discover a WTRU or a relay. A discovery message may be a discovery message (e.g., as described herein with respect to ProSe direct discovery models A and/or B), a DCR message (e.g., as described herein as an eV2X-based discovery mechanism), or a DNS response (e.g., as described herein as a DNS-based discovery mechanism).

A link measurement may refer to one or more of the following: signal strength, a channel quality indicator (CQI), channel state information (CSI), signal to noise ratio (SNR), signal to interference ratio (SIR), bit error rate (BER), hybrid automatic repeat request (HARQ) retransmissions, interference measurements, or the like.

A discoverer WTRU may discover a discoveree WTRU via a WTRU-to-WTRU relay (e.g., using a Model B discovery mechanism), for example, using code(s) and filter(s) provided by the network. For example, based on code(s) and filter(s) received from the network, an SU-WTRU may discover a WTRU-to-WTRU-relay and SP-WTRU(s) that support desired service(s) (e.g., "who is there?") and/or may discover a specific SP-WTRU (e.g., "are you there?") via a WTRU-to-WTRU relay.

Figure 7:
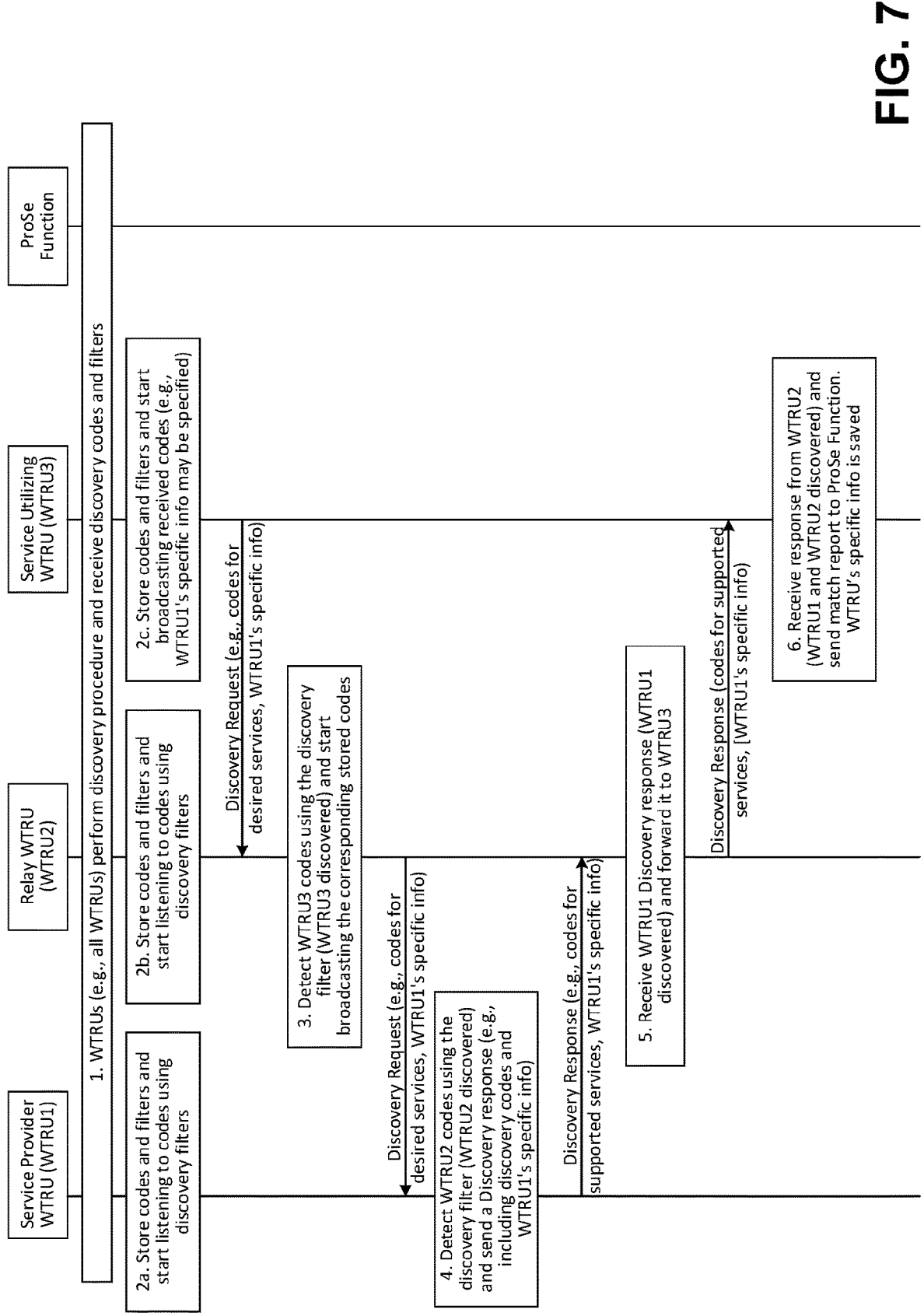
FIG. 7 illustrates an example of relay discovery and selection.

FIG. 7 illustrates an example of relay discovery and selection. FIG. 7 shows an example of a model B discovery model with a WTRU-to-WTRU relay. As shown by example in FIG. 7, at 1, WTRUs (e.g., all WTRUs, such as an SP-WTRU, a relay WTRU and an SU-WTRU) may perform a discovery procedure, for example, with a ProSe function. The WTRUs may obtain code(s) and discovery filter(s) (e.g., from the ProSe function).

At 2, the WTRUs (e.g., all WTRUs) may store the received code(s) and filter(s). At 2a, WTRU1 (e.g., an SP-WTRU) may start listening to code(s), for example, using the received filter(s). At 2b, WTRU2 (e.g., a relay WTRU) may start listening to code(s), for example, using the received filter(s). At 2c, WTRU3 (e.g., an SU-WTRU) may start broadcasting discovery message(s) (e.g., who supports that service?). The discovery message(s) may include code(s) corresponding to service(s) that WTRU3 is interested (e.g., configured or instructed) to discover. A discovery message may be referred to as a solicitation message. WTRU1 (e.g., SP-WTRU) specific information may be broadcasted (e.g., in addition to the codes), for example, to support "Are you there?" model. The specific information may be received from the ProSe function or may have been obtained from a previous communication with SP-WTRU (e.g., WTRU1).

At 3, WTRU2 may detect the broadcasted codes from WTRU3, for example, using the discovery filters. WTRU2 may re-broadcast the discovery message with WTRU2's corresponding codes. WTRU2's corresponding codes may be the same or different from WTRU3's codes.

At 4, WTRU1 may detect the broadcasted code(s) from WTRU2, for example, using the discovery filter(s). WTRU1 may respond, for example, by sending a discovery response message. WTRU1 may include WTRU1's specific information, which may include information that may be re-used to discover WTRU1 specifically using an "Are you there?" discovery model.

At 5, WTRU2 may receive the discovery response from WTRU1 (e.g., indicating WTRU1 is discovered). WTRU2 may forward the received discovery response to WTRU3.

At 6, WTRU3 may receive the discovery response from WTRU2 (e.g., indicating WTRU1 and WTRU2 are discovered). WTRU3 may send a match report to the ProSe function, for example, if the ProSe function is reachable.

Figure 8:
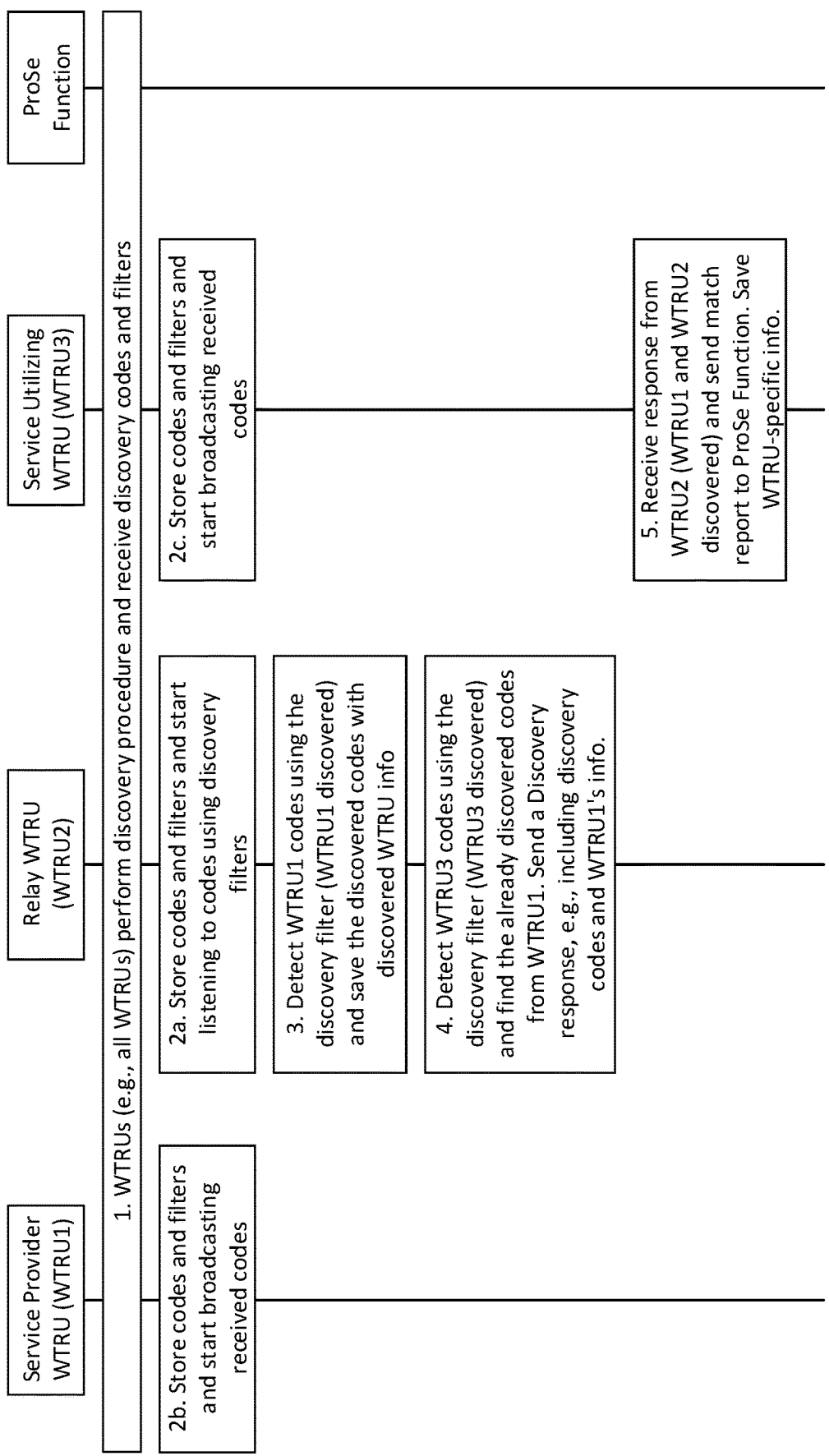
FIG. 8 illustrates an example of relay discovery and selection.

FIG. 8 illustrates an example of relay discovery and selection. FIG. 8 shows an example of a mixed discovery model that may mix Model A and Model B discovery models with a WTRU-to-WTRU relay. As shown by example in FIG. 8, at 1, WTRUs (e.g., all WTRUs, such as an SP-WTRU, a relay WTRU and an SU-WTRU) may perform a discovery procedure with the ProSe function. The WTRUs may obtain code(s) and discovery filter(s) (e.g. from the ProSe function).

At 2, the WTRUs (e.g., all WTRUs) may store the received codes and filters. At 2a, WTRU1 may start broadcasting discovery message(s) with WTRU1's supported service(s)/code(s) (e.g., Model A). At 2b, WTRU2 may start listening to code(s), for example, using the received discovery filter(s). At 2c, WTRU3 may start broadcasting discovery message(s) (e.g., Model B). Discovery message(s) may include code(s) corresponding to service(s) that WTRU3 may be interested (e.g., configured or instructed) to discover.

At 3, WTRU2 may detect the broadcasted code(s) from WTRU1, for example, using the discovery filters. WTRU2 may save WTRU1's supported service(s) (e.g., that map to WTRU2's discovery filters).

At 4, WTRU2 may detect the broadcasted code(s) from WTRU3, for example, using the discovery filter(s). WTRU2 may reply (e.g., immediately) to WTRU3, for example, by sending a discovery response, for example, including discovery code(s) and WTRU1's information.

At 5, WTRU3 may receive the discovery response from WTRU2 (e.g., indicating WTRU1 and WTRU2 are discovered). WTRU3 may send a match report to the ProSe function, for example, if the ProSe function is reachable.

Model B (e.g., "Who is there?") may be supported, for example, using a DCR discovery mechanism. For example, a service-oriented method based on a DCR message (e.g., as defined herein) may be used (e.g., re-used or re-purposed) for the support of Model B "Who is there?" discovery. An initiating WTRU (e.g., an SU-WTRU) may be looking for WTRU(s) (e.g., SP-WTRU(s)) that support the specific service(s) the initiating WTRU may want (e.g., be configured or instructed) to use. The initiating WTRU may trigger the discovery mechanism, for example, by sending a DCR message, which may include the initiating WTRU's user information and requested service(s). This may be different than a Model A discovery procedure, which may include supported service(s). The requested services may be indicated in a field in a DCR message. WTRUs receiving the DCR message may support the requested service(s). The WTRUs receiving the DCR message (e.g., the WTRUs that support the requested service(s)) may reply, for example, by triggering a PC5 unicast link establishment procedure (e.g., an existing PC5 unicast link establishment procedure). A WTRU may trigger a PC5 unicast link establishment procedure, for example, by using a user-oriented method (e.g., by specifying the initiating WTRU's user information and the supported services in the DCR message) or by using a service-oriented method (e.g., by specifying the supported services in the DCR message). The initiating WTRU receiving the DCR message(s) from one or multiple responding WTRUs may perform a WTRU selection and may establish a PC5 unicast link with the selected responding WTRU. A DCR message may be used (e.g., solely) as a discovery message, for example, if the service-oriented method is used with the requested service(s) specified. The example is illustrated in FIG. 9.

Figure 9:
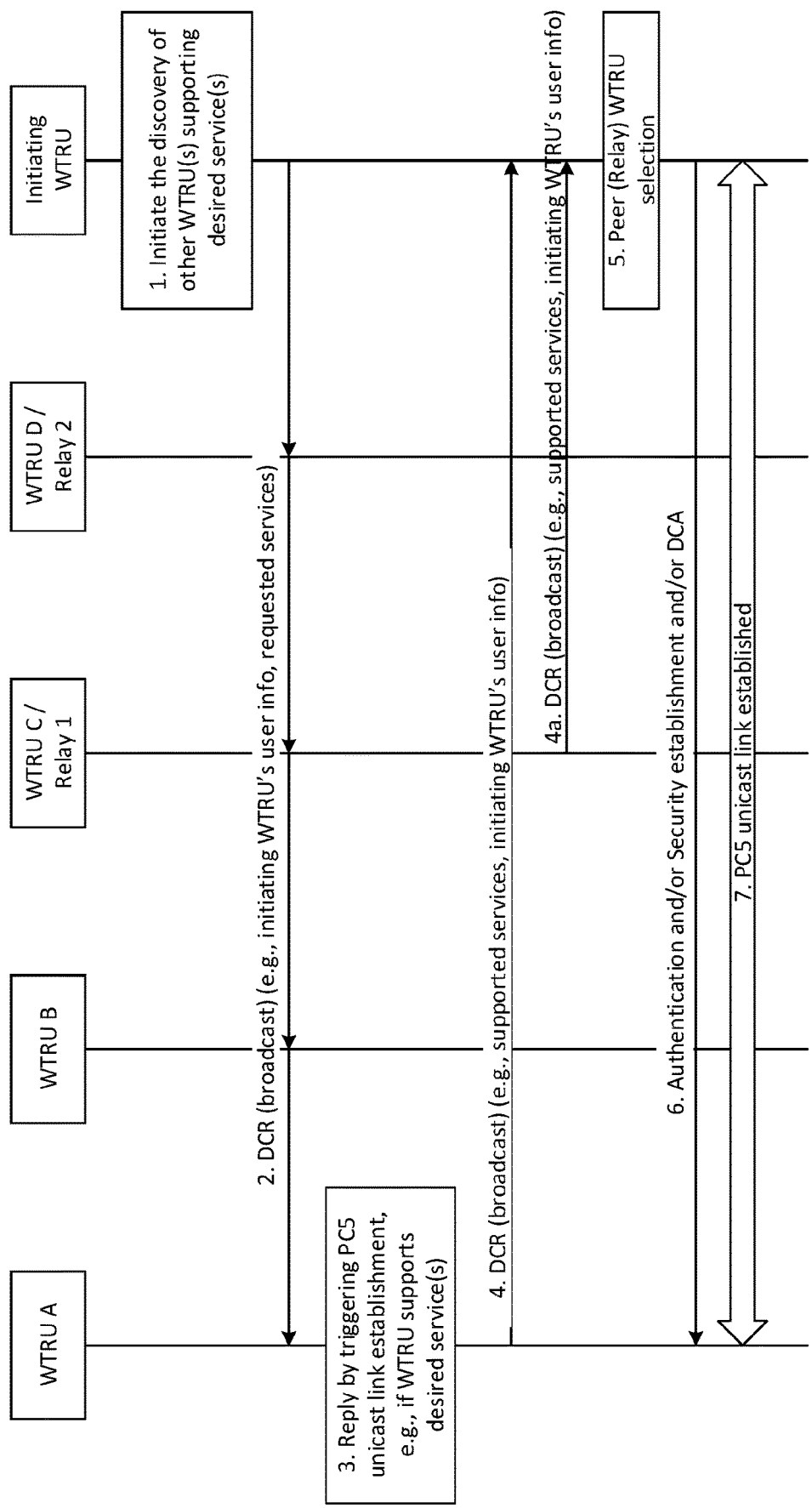
FIG. 9 illustrates an example of relay discovery and selection.

FIG. 9 illustrates an example of relay discovery and selection. FIG. 9 shows an example of support for discovery method B (e.g., "Who is there?") using a DCR as the discovery mechanism. As shown in FIG. 9, at 1, the initiating WTRU may send a DCR message asking who (e.g., which WTRU) supports the requested service(s). A DCR message may include the service(s) that the initiating WTRU desires to use (e.g., requested service(s)). The initiating WTRU's user information may be (e.g., may also be) specified on the DCR message. A DCR message may be referred as a DCR solicitation message.

At 2, WTRU A, WTRU B, WTRU C (Relay 1), and WTRU D (Relay2) may receive (e.g., may each receive) the DCR message and may determine (e.g., may each determine) whether (e.g., verify if) they support the requested service(s). A WTRU-to-WTRU relay receiving the DCR message (e.g., Relay 1 and Relay 2) may determine whether (e.g., verify if) the WTRU can relay the requested service(s), for example, based on the provisioned service(s) the WTRU-to-WTRU relay is allowed to relay. A WTRU-to-WTRU relay (e.g., each WTRU-to-WTRU relay) may re-broadcast the DCR message with the requested service(s), for example, if the requested services(s) are allowed to be relayed. WTRU A and WTRU B may receive the DCR message (e.g., the re-broadcasted DCR message) from Relay 1 and Relay 2, for example, in the alternative or in addition to receiving a DCR message from the initiating WTRU.

At 3, WTRU A may for example, by triggering a discovery procedure (e.g., the Model A or Model B "Are you there?" discovery procedure), for example, if WTRU A supports the requested service(s)) respond.

At 4, WTRU A may broadcast a DCR message, which may include WTRU A's supported service(s). The DCR message may include (e.g., may also include) the initiating WTRU's user information, for example, if Model B "Are you there?" is used as the discovery procedure. The DCR message may reach (e.g., be received by) the initiating WTRU and/or Relay 1. The DCR message may be referred to as a DCR response message, for example, in reference to (e.g., in response to) the DCR solicitation message in step 1. At 4a, Relay 1 may receive the DCR message from WTRU A and may forward the DCR message, for example, to the initiating WTRU.

At 5, the initiating WTRU may receive the one or multiple DCR messages, which may indicate the supported service(s) that match the initiating WTRU's earlier advertised requested service(s). The initiating WTRU may select WTRU A, for example, based on one or more criteria (e.g., provisioned rules, link measurements, etc.). The initiating WTRU may respond to the DCR received from WTRU A.

At 6, authentication and/or security may be established. DCA message(s) may be exchanged between the initiating WTRU and WTRU A. At 7, a PC5 unicast link may be established between WTRU A and the initiating WTRU.

WTRU-to-WTRU relay (re)selection may be based on end-to-end link measurement(s). Link measurement(s), link quality, and/or the like (e.g., between an SP-WTRU and a relay) may be included in a discovery message from a WTRU-to-WTRU Relay to an SU-WTRU. The discovery message (e.g., including link measurement(s), link quality, and/or the like) may be a relayed discovery message or a response to a discovery message. A discovery message that includes link measurement(s), link quality, and/or the like may support SU-WTRU selection of a WTRU-to-WTRU relay with awareness of the link quality between the SP-WTRU and the relay. A discovery message that includes link measurement(s), link quality, and/or the like may enable an SU-WTRU to perform relay selection, for example, based on measured end-to-end link quality (e.g., in addition to considering link measurement(s) between available relay(s) and SU-WTRU). Support for end-to-end link quality measurement(s) may be provisioned, for example, on a per-service basis on the peer WTRU(s) and WTRU-to-WTRU relay(s). Link quality measurement between an SP-WTRU and a WTRU-to-WTRU relay may (e.g., additionally and/or alternatively) be requested (e.g., on-demand) by an SU-WTRU (e.g., based on an indication included in a solicitation message by the SU-WTRU). An aggregate indication of the link quality between an SP-WTRU and a WTRU-to-WTRU relay may be utilized, for example, alternatively or in addition to a link quality measurement between an SP-WTRU and a WTRU-to-WTRU Relay.

A WTRU-to-WTRU relay may inform an SU-WTRU of the WTRU-to-WTRU relays output signal power, for example, if the WTRU-to-WTRU relay sends the discovery message to the SU-WTRU. This may support (e.g., may enable) the SU-WTRU to estimate the quality of the link, for example, based on the SU-WTRU's own measurement. The WTRU-to-WTRU relay may (e.g., additionally and/or alternatively) send a discovery message (e.g., the same discovery message) with multiple (e.g., two) different formats of protection, for example to improve the estimate. A first format may be one that the relay WTRU has utilized a protection algorithm (e.g., a robust protection algorithm, such as an algorithm using a channel coding and/or interleaving) with lower output power. A second format may be one that the relay WTRU has utilized a protection algorithm (e.g., a lighter protection algorithm) with higher signal power. The receiving SU-WTRU may decode (e.g., may try to decode) the multiple (e.g., both) messages, each with a different format. The SU-WTRU may report back to the relay the SU-WTRU's own estimate of the quality of the link (e.g., the offset between the received signals), for example, if the SU-WTRU successfully decodes the messages. A threshold value between the signals (e.g., the two signals) may be defined (e.g., based on implementation or standardization), for example, for the SU-WTRU to select a particular relay. A predefined sequence or bitmap may be used by a relay, for example, to inform the SU-WTRU of the type of protection algorithm used. Different versions of a signal being transmitted towards and/or received by the receiver may be performed in several different ways, such as a bitmap (e.g., a well-known bitmap) or a predefined sequence.

Discovery procedures (e.g., based on link measurements, link quality, and/or the like) described herein may be applicable to a link between an SP-WTRU and a relay. A relay may measure the quality of the link (e.g., toward the SP-WTRU) and may inform the SU-WTRU of the status of the link. This may help (e.g., may enable) the SU-WTRU to determine whether or not a particular relay should be chosen (e.g., selected from multiple relays), for example, for communication (e.g., between SP-WTRU and SU-WTRU). A relay may be (e.g., may also be) configured to inform multiple (e.g., both) parties (e.g., SU-WTRU and SP-WTRU) of the quality of multiple (e.g., both) links.

Other information (e.g., in addition to a link measurement(s) between an SP-WTRU and a relay) may be included in discovery message(s). A discovery message may include a number of hops (e.g., a number of relays) to reach an SP-WTRU (e.g., in multi-hop relays) and/or a cumulative link quality (e.g., based on a link quality of each of multiple hops, which may indicate or advertise a lowest link quality).

Figure 10:
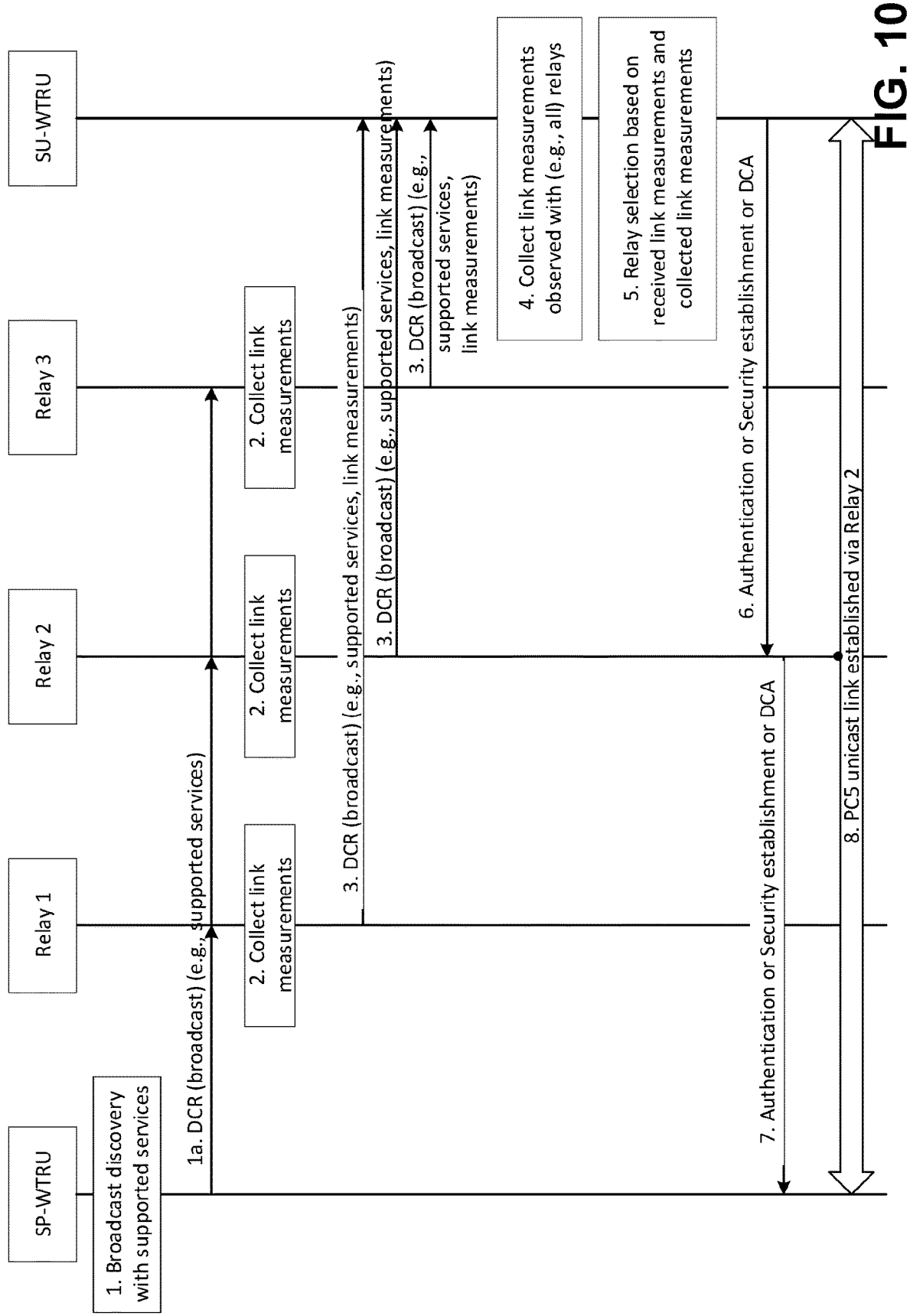
FIG. 10 illustrates an example of relay discovery and selection.

A discovery mechanism (e.g., a ProSe discovery mechanism or procedure) may use a DCR message. FIG. 10 illustrates an example of relay discovery and selection, for example, using a discovery mechanism based on (e.g., using) a DCR message. A PC5 unicast link may be established between peer WTRUs (as described herein). As shown in FIG. 10, at 1, an SP-WTRU may broadcast (e.g., periodically) one or more DCR messages, which may include supported services.

At 2, a relay WTRU (e.g., each relay WTRU, such as Relay 1, Relay 2, and Relay 3) that received the DCR message (and possibly other broadcast messages) may collect PC5 link measurement(s), for example, to determine (or to be able to determine) the link quality with the SP-WTRU (e.g., based on a measurement of the signal strength of the DCR message). A relay WTRU (e.g., each relay WTRU) may match the received supported services with the relay's configured services allowed to be relayed. A relay WTRU (e.g., each relay WTRU) may collect a connectivity matrix. The connectivity matrix may capture possible bi-directional and/or mono-directional connectivity to other relay WTRU(s). The connectivity matrix may capture capabilities of other relay WTRU(s) (e.g., security (e.g., capability of encryption algorithm(s)), connectivity, and/or the like) and/or the contextual information associated with such other relay WTRU(s) (e.g., location, mobile level (e.g., mobile or stationery), schedule(s) of availability (e.g., what hours of the day or what days of the week)). A relay WTRU (e.g., each relay WTRU) may keep track of the SP-WTRU and supported/matching services, for example, if the received supported services match the allowed services allowed by the relay WTRU.

At 3, a relay WTRU (e.g., each relay WTRU) may (re-)broadcast the DCR message with the matching supported services and may add the link measurements (and/or link quality) over the PC5 link with the SP-WTRU (e.g., based on a measurement of the signal strength of the DCR message). The SU-WTRU may receive the DCR message(s) from the relay WTRU(s) (e.g., Relay 1, Relay 2, and/or Relay 3). A relay WTRU (e.g., each relay WTRU) may (re-)broadcast a connectivity matrix. The connectivity matrix may capture possible bi-directional and/or mono-directional connectivity to other relay WTRU(s). The connectivity matrix may capture capabilities of other relay WTRU(s) (e.g., security (e.g., encryption algorithm(s)), connectivity, and/or the like) and the contextual information associated with such other relay WTRU(s) (e.g., location, mobile level, schedule(s) of availability)

At 4, the SU-WTRU may listen to broadcasted messages from the relay(s) and may calculate the link measurement(s)/link quality and/or the information available from and/or derived from connectivity matrix(es) associated with the relay(s) (e.g., a number of hops (e.g., a number of relays) to reach a particular node), for example, based on the received broadcast messages. For example, the connectivity matrix(es) associated with the relay WTRU(s) may be combined/aggregated for its use as is or creating derived information. Derived information may be a number of hops (e.g., a number of relays) to reach a particular node (e.g., the SP-WTRU) from the SU-WTRU. Derived information may be a value (e.g., a binary value) indicating if a direct communication link exists between two nodes (e.g., a value 1 indicating a direct communication link exists between SP-WTRU and a value 0 indicating a direct communication link does not exist between SP-WTRU and Relay 3).

At 5, the SU-WTRU may select a relay (e.g., based on a relay selection procedure) for a specific service, for example, based on the observed link measurement(s) with the relay WTRU(s). The SU-WTRU may consider (e.g., may also consider) the link measurement(s) over the PC5 link between the SP-WTRU and a relay WTRU (e.g., each WTRU) of the relay WTRU(s) (e.g., as advertised by the relay WTRU in a DCR message). In an example, Relay 2 may be selected among the relays, for example, if Relay 2 provides a superior overall end-to-end link quality, which may be based on a combination of observed PC5 link measurement(s) (e.g., between the SU-WTRU and Relay 2) and received PC5 link measurement(s) (e.g., between the SP-WTRU and Relay 2), where the combined/overall link quality is better than combined/overall link quality for Relay 1 and Relay 3. The SU-WTRU may make a relay selection decision, for example, based on the information available from and/or derived from the connectivity matrix(es) associated with the relay WTRU(s) (e.g., a number of hops (e.g., a number of relays) to reach a particular node).

At 6, the SU-WTRU may reply to the link establishment request via Relay 2. At 7, Relay 2 may forward the message to the SP-WTRU. At 8, a PC5 unicast link may be established with SP-WTRU via Relay 2.

The SU-WTRU may monitor (e.g., periodically) the quality of the end-to-end link with SP-WTRU (e.g., if SU-WTRU is connected to the relay), for example, for relay reselection purpose(s). The SU-WTRU may perform measurement(s) of the quality of the PC5 links between the SU-WTRU and the relay(s) in proximity (e.g., including Relay 2). The SU-WTRU may process DCR message(s) from the relay(s) (e.g., including Relay 2), for example, to determine the PC5 link quality between the SP-WTRU and the relay(s). The SU-WTRU may reselect a different relay to connect with SP-WTRU, for example, based on a comparison of the various end-to-end link quality measurements.

This mechanism (e.g., procedure) may cover (e.g., may also cover) a discovery mechanism based on DCR with Model B (e.g., "Who is there?"), for example, as described herein. An SU-WTRU may send (e.g., periodically) solicitation messages (e.g., if the SU-WTRU is connected to a relay), for example, for relay reselection purpose(s). An SP-WTRU may send (e.g., in response to the solicitation messages) response message(s), for example, to enable end-to-end link measurement via the relays. An SU-WTRU may process response message(s) from the relays, for example, to determine each relay-SP-WTRU link quality. An SU-WTRU may include an indication (e.g., an explicit indication) in a solicitation message, for example, to obtain relay-SP-WTRU link quality measurement(s) from a relay (e.g., each relay). An SU-WTRU may measure the signal strength of a response message from a relay (e.g., each relay). The SU-WTRU may use the measurement in combination with the link quality measurement (e.g., included in a response message from a relay (e.g., each relay)) to determine an end-to-end link quality (e.g., a best end-to-end link quality) for relay (re)selection (e.g., according to the procedure described herein). The SU-WTRU may make a relay selection decision using a key performance indicator. In examples, the SU-WTRU may select a relay if a key performance indicator associated end-to-end link quality measurement(s) (e.g., signal attenuation) is satisfied. A key performance indicator may be that end-to-end link quality measurement(s) (e.g., signal attenuation) from a SP-WTRU to the SU-WTRU is no more than a threshold.

A discovery mechanism (e.g., procedure) may use a DCR message and multi-hop relays.

Figure 11:
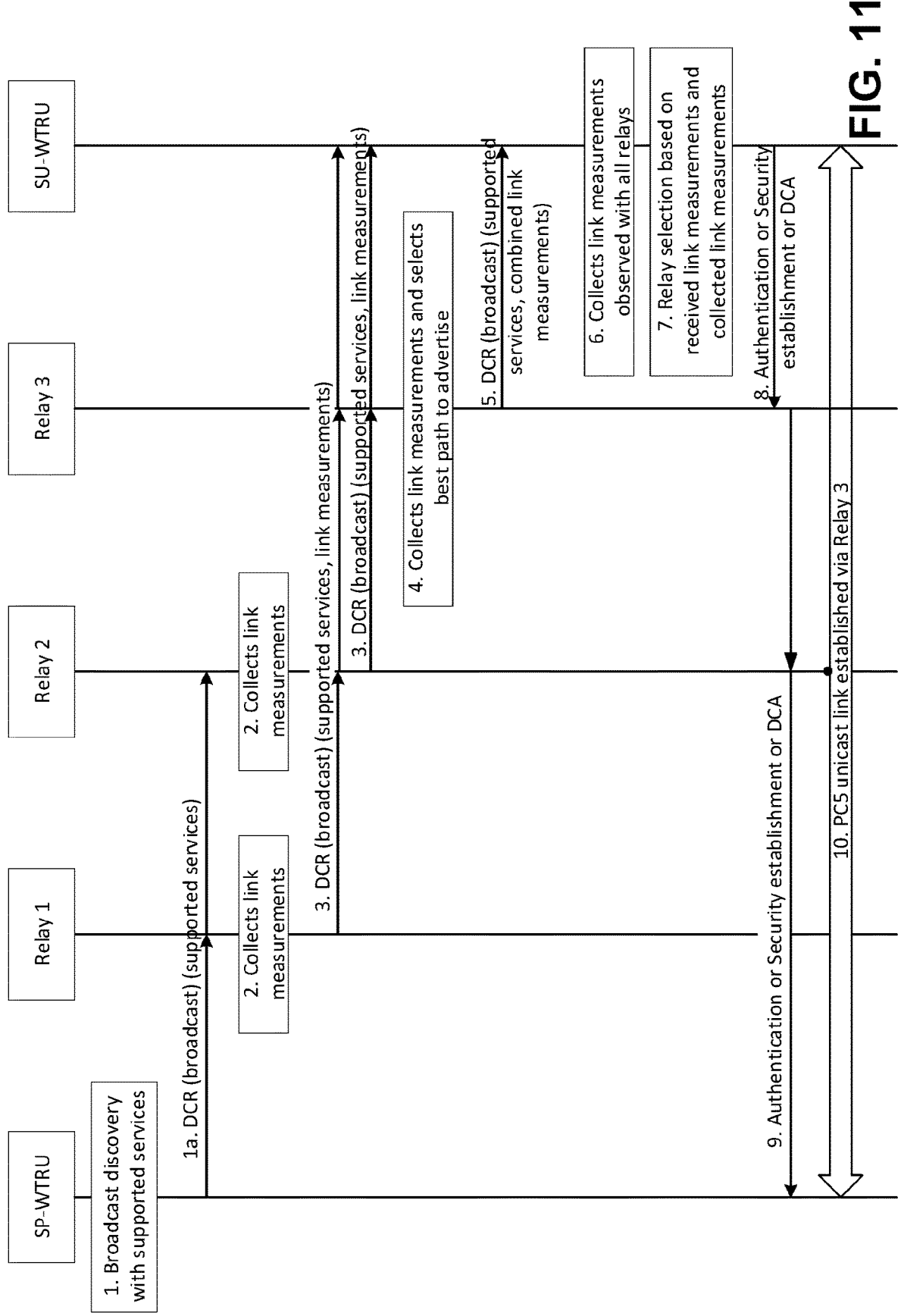
FIG. 11 illustrates an example of relay discovery and selection.

FIG. 11 illustrates an example of relay selection using a discovery mechanism based on DCR message and with the support of multi-hop relays. Multi-hop relays may use multiple relays for the communication between a SP-WTRU and a SU-WTRU.

Relay 1 and Relay 2 may be able to communicate (e.g., directly) with the SP-WTRU and SU-WTRU. Relay 3 may not be able to communicate (e.g., directly) with the SP-WTRU but may be able to communicate (e.g., directly) with Relay 1, Relay 2, and the SU-WTRU.

At 1, the SP-WTRU may broadcast (e.g., periodically) DCR message(s), which may include the supported service(s).

At 2, Relay 1 and/or Relay 2 may receive a DCR message (and possibly other broadcast message(s)) and collect PC5 link measurement(s), for example, to be able to determine link quality with the SP-WTRU (e.g., based on a measurement of the signal strength of the DCR message). Relay 1 and/or Relay 2 may match the received supported service(s) with their configured service(s) allowed to be relayed. Relay 1 and/or Relay 2 may collect respective connectivity matrix (es). A connectivity matrix may capture possible bi-directional and/or mono-directional connectivity to other relay WTRU(s). The connectivity matrix may capture capabilities of such other relay WTRU(s) (e.g., security (e.g., capability of encryption algorithm(s)), connectivity, and/or the like) and the contextual information associated with such other relay WTRU(s) (e.g., location, mobile level (e.g., mobile or stationery), schedule(s) of availability (e.g., what hours of the day or what days of the week)). Relay 1 and/or Relay 2 may keep track of the SP-WTRU and supported/matching service(s), for example, if the received supported service(s) match the allowed service(s).

At 3. Relay 1 and/or Relay 2 may (re-)broadcast the DCR message (e.g., if the DCR message includes the matching supported service(s)), and may add the link measurement(s) (and/or link quality) over the PC5 link with the SP-WTRU (e.g., based on a measurement of the signal strength of the DCR message). The SU-WTRU may receive a DCR message from Relay 1 and/or Relay 2. Relay 1 and/or Relay 2 may (re-)broadcast connectivity matrix(es). The connectivity matrix may capture possible bi-directional and/or mono-directional connectivity to other relay WTRU(s). The connectivity matrix may capture capabilities of such other relay WTRUs (e.g., security, connectivity, and/or the like) and/or the contextual information associated with such other relay WTRU(s) (e.g., location, mobile level, schedule(s) of availability).

At 4, Relay 3 may receive the DCR message(s) from Relay 1 and/or Relay 2 and may collect link measurement(s) and/or the information available from or derived from the connectivity matrix associated with Relay 1/Relay 2 (e.g., a number of hops (e.g., a number of relays) to reach a particular node).

Relay 3 may combine the links measurement(s) obtained with Relay 1 with the received measurement(s) on the DCR message from Relay 1. Relay 3 may repeat this calculation with Relay 2.

Relay 3 may select a path (e.g., a best path, which may be via Relay 2) to be advertised, for example, based on the result(s) of the calculation, which may be observed link measurement(s) combined with received link measurement(s).

At 5. Relay 3 may broadcast a DCR message (e.g., from Relay 2) (e.g., if the DCR message includes the matching supported service(s)) and may add the combined link measurements (and/or link quality) of the selected path over the PC5 link with the SP-WTRU. Relay 3 may broadcast its connectivity matrix. Relay 3 may (re-)broadcast connectivity matrix(es) matching the selected path, e.g. from Relay 1 or Relay 2.

Relay 3 may not select a path (e.g., a best path). Relay 3 may re-broadcast the DCR message(s) received from Relay 1 and/or Relay 2, which may include the combined link measurements and the connectivity matrix(es) from Relay 1 and/or Relay 2.

At 6, the SU-WTRU may receive DCR message(s) from Relay 1, Relay 2 and/or Relay 3. The SU-WTRU may calculate the link measurement(s)/link quality between itself and the respective relay WTRU(s). The SU-WTRU may calculate the information available from and/or derived from connectivity matrix(es) associated with the Relay 1, Relay 2, and Relay 3 (e.g., a number of hops (e.g., a number of relays) to reach a particular node). For example, the connectivity matrixes associated with the Relay 1, Relay 2, and Relay 3 may be combined/aggregated for the use as is or creating derived information. Derived information may be, for example, a number of hops (e.g., a number of relays) to reach a particular node (e.g., the SP-WTRU) from the SU-WTRU. Derived information may be a value (e.g., a binary value) indicating if a direct communication link exists between two nodes (e.g., a value 1 indicating a direct communication link exists between SP-WTRU and a value 0 indicating a direct communication link does not exist between SP-WTRU and Relay 3).

At 7, the SU-WTRU may perform a relay selection for a specific service, for example, based on the observed link measurement(s) with the relay WTRU(s). The SU-WTRU may consider the link measurement(s) over the PC5 link between the SP-WTRU and a relay WTRU (e.g., as advertised by the relay WTRU on the DCR message). For example, Relay 2 may be selected among the relays, for example, if it provides an improved overall end-to-end link quality. Relay 2 may be considered to provide a superior overall end-to-end link quality, for example, if combined observed PC5 link measurement(s) (e.g., between the SU-WTRU and Relay 2) and received PC5 link measurement(s) (e.g., between the SP-WTRU and Relay 2) may be better than the combined link measurements associated with Relay 1. Measurements from Relay 3 may include combined measurement(s) between the SP-WTRU and Relay 1 or Relay 2 and measurement(s) between Relay 1 or Relay 2 and Relay 3. The SU-WTRU may make a relay selection decision, for example, based on the information available from and/or derived from the connectivity matrix associated with the relay(s) (e.g., Relay 1, Relay 2, and/or Relay 3) (e.g., a number of hops (e.g., a number of relays) to reach a particular node). The SU-WTRU may make a relay selection decision using a key performance indicator. In examples, the SU-WTRU may select a relay if a key performance indicator is satisfied. A key performance indicator may be that no more than a number of hops (e.g., a number of relays) are used to reach a SP-WTRU. A key performance indicator may be that end-to-end link quality measurement(s) (e.g., signal attenuation) from a SP-WTRU to the SU-WTRU is equal to or higher than a threshold.

At 8, the SU-WTRU may reply to the link establishment request via Relay 3.

At 9, Relay 3 may forward the message to the SP-WTRU (e.g., via Relay 2).

At 10, a PC5 unicast link may be established with the SP-WTRU via Relay 2 and Relay 3.

Combining received measurement(s) and observed measurement(s) may apply to multi-hop relays, which may include any number of relays between the SP-WTRU and the relay receiving the DCR message (e.g., Relay 3 in this example). For example, Relay 3 may receive a DCR message from Relay 1, which may include combined measurements of PC5 links from the SP-WTRU to Relay A, Relay A to Relay B, Relay B to Relay C, etc. up to Relay 1.

Figure 12:
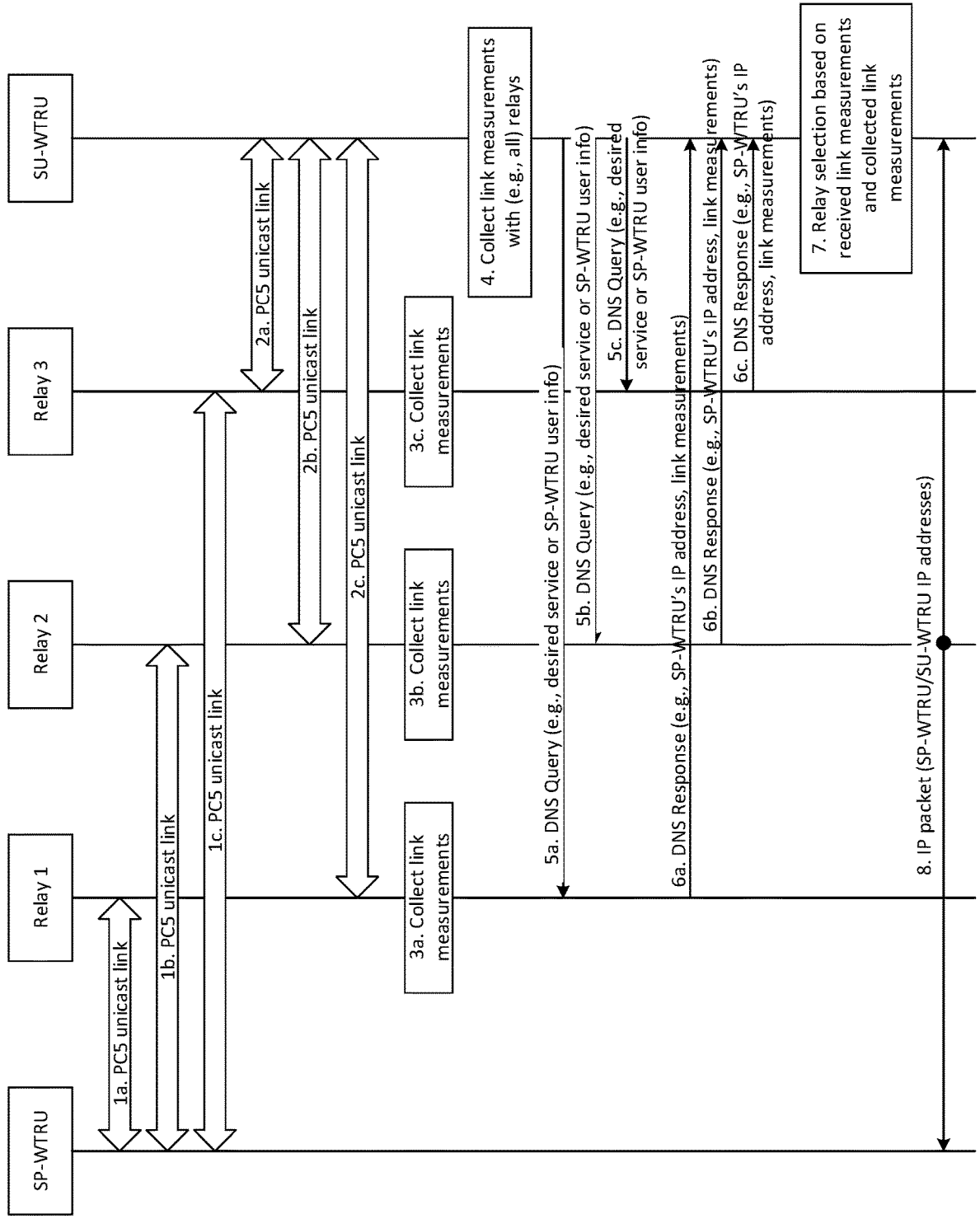
FIG. 12 illustrates an example of relay discovery and selection.

A discovery mechanism may use one or more DNS messages. FIG. 12 illustrates an example of relay discovery and selection. FIG. 12 shows an example of WTRU-to-WTRU Relay selection using a discovery mechanism based on one or more DNS messages. There may be a first PC5 unicast link between the SP-WTRU and WTRU-to-WTRU Relay and a second PC5 unicast link between the WTRU-to-WTRU Relay and SU-WTRU (e.g., as described herein). As shown in FIG. 12, at 1 (e.g., 1a, 1b, 1c), an SP-WTRU may establish PC5 unicast link(s) with one or more WTRU-to-WTRU relays in its vicinity. A WTRU-to-WTRU relay (e.g., each WTRU-to-WTRU relay) may maintain a mapping with the SP-WTRU's IP address and/or the corresponding SP-WTRU's user information.

At 2 (e.g., 2a, 2b, 2c), the SU-WTRU may establish PC5 unicast link(s) with one or more WTRU-to-WTRU Relays in the vicinity (e.g., in the communicative vicinity) of the SU-WTRU. A WTRU-to-WTRU relay (e.g., each WTRU-to-WTRU relay) may maintain a mapping with the SU-WTRU's IP address and/or the corresponding SU-WTRU's user information.

At 3, a WTRU-to-WTRU relay (e.g., each WTRU-to-WTRU) may collect link measurement(s) on the established PC5 unicast link(s).

At 4, the SU-WTRU may collect (e.g., may also collect) link measurement(s) on the established PC5 unicast link(s).

At 5, the SU-WTRU may want (e.g., be configured or instructed) to communicate with an SP-WTRU or access an SP-WTRU, which may support service(s) desired by the SU-WTRU. The SU-WTRU may send a DNS query message, which may include the SP-WTRU's user information and/or desired service(s) to one or more (e.g., all) of the WTRU-to-WTRU relays (e.g., over the PC5 unicast links), for example, to obtain the SP-WTRU's IP address. The DNS query may include an indication (e.g., an explicit indication) requesting a link measurement between the relay and the SP-WTRU. The DNS Query may trigger a signaling request message (e.g., a keep-alive request message) from the relay to the SP-WTRU, for example, to enable the relay to perform a current link quality measurement (e.g., based on signaling response message signal strength). The relay may retrieve (e.g., alternatively and/or additionally) a last known link quality measurement (e.g., on the PC5 link) between the relay and SP-WTRU. A link measurement may have been obtained and/or stored, for example, based on prior measurement(s)/communication(s) between the relay and SP-WTRU. For example, the relay may obtain (e.g., once) one or more link measurements and may share the link measurements with multiple SU-WTRUs (e.g., SU-WTRUs that have sent a DNS Query message requesting information about the same SP-WTRU). Stored measurements (e.g., the same stored measurements) may be included in each DNS response to the SU-WTRUs that have sent a DNS Query message requesting information about the SP-WTRU. A relay may consider whether to obtain additional measurement(s) (e.g., new measurement(s)) or whether existing measurement(s) remain accurate and may be returned without triggering an exchange of messages with the SP-WTRU, for example, in order to provide accurate measurement(s). The determination may be based on a measurement time duration (e.g., a measurement timer) or a time to live (TTL) for measurement(s), which may be pre-configured for the WTRU. A relay may obtain additional link measurement(s) (e.g., new link measurement(s)) before sending a DNS response (e.g., a DNS response that includes the new/additional link measurements) to the SU-WTRU, for example, if a time duration (e.g., a measurement time duration or a timer) or TTL expired. The relay may respond (e.g., immediately) to the SU-WTRU with a DNS response (e.g., a DNS response that includes previous/saved link measurement(s)), for example, otherwise.

At 6, a WTRU-to-WTRU relay (e.g., each WTRU-to-WTRU relay) may find the SP-WTRU's user information (and/or the desired service) in the relay's mapping table. A WTRU-to-WTRU relay (e.g., each WTRU-to-WTRU relay) may reply to the SU-WTRU, for example, by sending a DNS response message. A message may include the SP-WTRU's IP address, the observed link measurements, and/or link quality measurements (e.g., between the WTRU-to-WTRU relay and the SP-WTRU).

At 7, the SU-WTRU may select the WTRU-to-WTRU relay to communicate with the SP-WTRU. The SU-WTRU may wait for the reception of multiple DNS responses or for some (e.g., configured) time, and may perform a selection. The SU-WTRU may perform relay selection, for example, based on the observed link measurements with the WTRU-to-WTRU relays and/or the link measurement(s) between the SP-WTRU and the WTRU-to-WTRU relay (e.g., as may be advertised by the WTRU-to-WTRU relay on the DNS response message). Relay 2 may be selected, for example, based on the observed end-to-end link quality. End-to-end link quality may be based on combined observed link measurement(s) (e.g., between the SU-WTRU and a WTRU-to-WTRU relay) and received link measurement(s) (e.g., between the SP-WTRU and a WTRU-to-WTRU relay).

At 8, the SU-WTRU and SP-WTRU may communicate, for example, by sending IP packet(s) over the PC5 unicast links established with the WTRU-to-WTRU relay (e.g., Relay 2), which may act/operate as an IP router. The SU-WTRU may perform end-to-end link measurement(s), for example, for relay reselection purpose(s). The SU-WTRU may perform end-to-end link measurement(s) across one or more relays (e.g., all relays) the SU-WTRU is connected to, for example, by issuing (e.g., periodic) DNS queries (e.g., periodic DNS query (or queries)) (e.g., as described herein). The SU-WTRU may reselect a different relay to communicate with the SP-WTRU, for example, based on a comparison of the various end-to-end link quality measurements. The SU-WTRU may perform (e.g., alternatively and/or additionally) an end-to-end link measurement, for example, if the SU-WTRU detects that the link quality is going down, e.g. falling below a configured quality threshold. The SU-WTRU may monitor end-to-end link quality with (e.g., only with) a WTRU-to-WTRU relay (e.g., Relay 2), for example, by sending (e.g., periodically) DNS queries to the relay (e.g., Relay 2). The SU-WTRU may start monitoring end-to-end link quality with other relays (e.g., by sending (e.g., periodically) DNS queries to such other relays), for example, if end-to-end link quality via Relay 2 degrades. A relay may send one or more DNS records for an SP-WTRU, for example, with a TTL set to a value (e.g., a value indicating a short TTL). An SU-WTRU may send DNS query (or queries) (e.g., as frequently as necessary) to obtain accurate and/or up to date link measurement(s), which may be based on a configured link measurement time duration (e.g., a configured link measurement timer).

A DNS is an example manifestation of a more general routing/mapping table(s)-based discovery mechanism. The procedure described herein may apply to other routing/mapping table-based discovery mechanism(s).

A discovery mechanism may use an independent discovery message. One or more independent discovery messages may be sent to discover one or more SP-WTRUs and/or may be sent for SP-WTRUs to advertise supported services (e.g., as described herein). A discovery message sent by an SP-WTRU to advertise supported services may be relayed (e.g., similar to direct discovery described herein), for example, by a WTRU-to-WTRU relay (e.g., with link measurement(s)) for communication between the SP-WTRU and the WTRU-to-WTRU relay. The SU-WTRU may use the information (e.g., together with other information) to perform SP-WTRU and/or WTRU-to-WTRU relay selection(s).

WTRU-to-network relay (re)selection may be based on one or more Uu link measurements. In some examples, a WTRU-to-network relay may measure the link quality of the Uu interface. The WTRU-to-network relay may provide the link quality of the Uu interface to a remote WTRU, for example, during a network relay discovery procedure or a PC5 connection establishment procedure. A remote WTRU may receive a Uu interface link quality from multiple WTRU-to-network relays. The Remote WTRU may select a WTRU-to-network relay (e.g., from among multiple WTRU-to-network relays), for example, based on the Uu interface link quality (e.g., in addition to PC5 link quality).

In some examples Model A may be used. For example, the WTRU-to-network relay may broadcast the Uu interface link quality in an announcement message. In some examples Model B may be used. For example, the WTRU-to-network relay may include the Uu interface link quality in a solicitation response message. In some examples direct communication without discovery may be used. For example, the WTRU-to-network relay may include the Uu interface link quality in a direct communication request or in a direct communication response message.

In some examples (e.g., if Model B is used or direct communication without discovery is used), a remote WTRU may initiate the discovery mechanism. The remote WTRU may specify the service(s) the remote WTRU may be interested in and may specify, for example, a Uu measurements indication. A Uu measurements indication may indicate that the remote WTRU requests (e.g., would like to receive) Uu measurements from the responding network relay(s) that may support the requested service(s).

A network functionality (e.g., policy control function (PCF)) may indicate to a WTRU-to-network relay whether to provide Uu interface link quality to a remote WTRU, for example, during an authorization and provisioning procedure.

In the case of a handover, a remote WTRU may receive a Uu interface link quality from one or more candidate WTRU-to-network relays. The remote WTRU may provide the Uu interface link quality of a candidate WTRU-to-network relay (e.g., each candidate WTRU-to-network relay) to the network (e.g., via measurement report(s)). The network may make a handover decision, for example, based on (e.g., in response to receiving) the Uu interface link quality. The network may select a WTRU-to-network relay to hand over the remote WTRU to, for example, based on the Uu interface link quality.

A remote WTRU may monitor the quality of an end-to-end link with one or more WTRU-to-network relays (e.g., for relay selection purposes). A remote WTRU may monitor (e.g., periodically) the quality of an end-to-end link with one or more WTRU-to-network relays (e.g., link quality over each PC5 and Uu interface), for example, if the remote WTRU is connected to the WTRU-to-network relay. A remote WTRU may process (e.g., periodically) the Uu link quality measurements in announcement messages from the one or more WTRU-to-network relays, for example, if Model A is used. A remote WTRU may send (e.g., periodically) solicitation messages and may obtain the Uu link quality measurements in the corresponding response messages from the one or more WTRU-to-network relays, e.g., if Model B is used. A remote WTRU may select a different WTRU-to-network relay, for example, based on one or more selection procedures (e.g., as described herein).

A remote WTRU may use network assistance for WTRU-to-network relay discovery and/or selection. A procedure (e.g., a procedure similar to EPC-level ProSe discovery) may be enhanced, for example, to enable WTRU-to-network relay selection (e.g., based on Uu link quality measurements obtained from the network). A remote WTRU and a WTRU-to-network relay may perform a WTRU registration. A network function (NF) may provide ProSe functionality (e.g., code management, assistance for proximity detection and/or the like). An NF may be a direct discovery name management function (DDNMF). An NF may use service(s) from network provided location services (LCS), for example, to obtain location information and/or associated link quality measurements. A different NF may serve each of multiple remote WTRUs and/or relays. A remote WTRU may send a proximity request for WTRU-to-network relays to an NF. A proximity request may include a range and/or a desired Uu signal strength level threshold. A network relay's (e.g., each network relay's) serving NF may obtain location information and/or Uu uplink/downlink measurements for the network relay. The remote WTRU's serving NF may collect location and/or Uu uplink/downlink measurements from the relays' serving NF. The remote WTRU's serving NF may send a proximity alert message to the remote WTRU (e.g., a proximity alert message that includes the Uu link measurements), for example, if the remote WTRU's serving NF detects a relay that satisfies the location, range, Uu link quality, and/or other criteria. The remote WTRU may select and connect to the network relay, for example, based on the Uu link measurement in the proximity alert message. The remote WTRU may receive a proximity alert associated with a WTRU-to-network relay, such as a new WTRU-to-network relay (e.g., over the connection with the current network relay), for example, if the remote WTRU is connected with a network relay. The remote WTRU may reselect the new network relay, for example, based on a comparison of PC5 and Uu links quality measurements between the current relay and the new relay.

Network Relay behavior may include one or more of the following. A network relay may receive a Uu interface measurement indication (e.g., from a PCF), for example, during an authorization and provisioning procedure. The network relay may measure a Uu interface link quality. The network relay may provide the measured Uu interface link quality, for example, to a remote WTRU.

Remote WTRU behavior may include one or more of the following. A remote WTRU may receive the Uu interface link quality, for example, from the network relay. The remote WTRU may select a network relay for PC5 communication, for example, based on the Uu interface link quality of each of multiple network relays. The remote WTRU may provide the Uu interface link quality of a candidate network relay, for example, to the network (e.g., for a handover decision).

A remote WTRU or SU-WTRU may specify/indicate requested indicator(s) (e.g., key performance indicator(s) (KPI(s))) in a discovery request. A remote WTRU may specify the minimum Uu KPI(s) (and/or any other either individual or aggregate KPI(s)) and/or one or more expected/desired behaviors (e.g., mobility level and schedule, location, etc.) that may be supported for service(s) the remote WTRU may be interested in, for example, in the case of sending a discovery message. A network relay (e.g., a network relay that supports the specified service(s), meets the specified minimum KPI(s), and/or meets expected/desired behavior(s)) may respond, for example, by sending one or more discovery response messages, by advertising supported service(s), and/or by providing one or more KPIs (e.g., Uu link measurement(s)). A network relay may not respond to the discovery message, for example, if the network relay supports the service(s) but does not the minimum required KPI(s).

A network relay may advertise expected behavior, for example, as part of a discovery mechanism/procedure. A remote WTRU may take the information about expected behavior into account, for example, for network relay selection and/or during a handover procedure. Expected behavior may include not moving during the day, and moving into another area (e.g., at a particular time, such as starting at 9 PM). A remote WTRU may select a network relay, for example, based on knowing (e.g., assuming, such as based on history or configuration) that the remote WTRU may be in an area for some time. A remote WTRU may not select a relay, for example, based on knowing (e.g., assuming, such as based on history or configuration) that the remote WTRU may be moving (e.g., soon).

An SU-WTRU may specify the minimum PC5 indicator(s) (e.g., KPI(s)) to be supported based on service(s) the SU-WTRU may be interested in, for example, in the case of sending a discovery message. A WTRU-to-WTRU relay (e.g., a WTRU-to-WTRU relay that supports the specified service(s) and that meets the specified minimum KPI(s)) may respond, for example, by sending one or more discovery response messages, by advertising supported services, and/or by providing KPI (e.g., link measurements). A relay may not respond to the discovery message, for example, if the relay supports the service(s) but does not the meet minimum a requested KPI(s).

A WTRU-to-WTRU relay may advertise expected behavior, for example, as part of a discovery mechanism/procedure. An SU-WTRU may take the information into account, for example, for relay selection.

An SP-WTRU may specify its supported KPIs per services, for example, in the case of sending an Announcement message.

An WTRU-to-WTRU relay may receive a first Announcement message, for example, from an SP-WTRU or from another WTRU-to-WTRU relay. The first Announcement message may contain supported KPI(s) per service. The WTRU-to-WTRU relay sends a second Announcement message, for example, if it supports the specified service. The included KPI(s) are updated considering the WTRU-to-WTRU relay's own capabilities. For example, the advertised KPIs may indicate higher delay(s) than the received KPI(s) and/or lower throughput than the received KPI(s).

A network relay may provide (e.g., broadcast or forward) an algorithm, a function, and/or an artificial intelligence (AI)/machine learning (ML) model for relay WTRU selection, for example, to a remote WTRU during Model A "I am here" discovery).

A network relay may provide (e.g., may advertise) an algorithm, a function, and/or an AI/ML model for relay WTRU selection, for example, as part of a PC5 discovery mechanism/procedure. A PC5 discovery message may include one or more of the following: an algorithm, a function, and/or an AI/ML model; the pointer(s) and/or the identity(s) of an algorithm, a function, and/or an existing (e.g., pre-provisioned) AI/ML model on the remote WTRU; and/or a set of parameters (e.g., coefficients for the polynomial, weights for neural network) that may, e.g., upon loading in an algorithm, function, and/or A/ML model, as may be indicated by its identity, indicate a selection of an algorithm, function, and/or AI/ML model that the remote WTRU may use for network relay selection.

An algorithm, function, and/or AI/ML model may be (e.g., additionally and/or alternatively) loaded/provisioned, for example, using a ProSe application, a pre-established PC5 exchange, prior direct Uu connectivity, and/or an out of band mechanism (e.g., outside of the PC5 discovery).

A remote WTRU and/or a network relay may participate in a cooperative ML process. For example, data may be collected, for example, in the case of a successful or unsuccessful Relay selection, in the case that the QoS is achieved, in the case that the security level is achieved, and/or in the case that alike event occurs. The collected data may be labeled as a subset of training and/or validation dataset, which may be used by a dedicated ML node. The dedicated ML node (e.g., a designated relay WTRU) may coordinate distributed learning, for example, among other nodes (e.g., other relay WTRU(s) or remote WTRU(s)). Such cooperative ML coordination may include receiving the data collected, for example, in the case of a successful or unsuccessful relay selection, in the case that the QoS is achieved, in the case that the security level is achieved, and/or in the case alike event occurs. The collected data may be labeled as a subset of training and/or validation dataset, which may be used by a dedicated ML node. Unlabeled training data may be used for unsupervised learning e.g., clustering different relay target selections. Such cooperative ML coordination may include collating the training/validation datasets, which may be received from other cooperative ML contributor(s). Such cooperative ML coordination may include deriving a single ML Model, for example, based on the collated training/validation dataset. Such cooperative ML coordination may include distributing the derived ML Model to other cooperative ML contributor(s), for example, for running the ML Model(s) locally (e.g., Local Inference) as an input to the relay selection.

The foregoing examples may assume that an algorithm (e.g., each algorithm), a function (e.g., each function), and/or an A/ML model (e.g., each AL/ML model) has an identity. An identity for an algorithm, function, or AI/ML model may be globally or locally unique. An identity may allow identification of what algorithm, function, or AI/ML model that may be (e.g., may already be) loaded on a remote WTRU, that may be to be loaded (e.g., may need to be loaded) to the remote WTRU, or that may be to be replaced (e.g., may need to be replaced) on the remote WTRU.

A first wireless transmit-receive unit (WTRU) and/or a method performed by the first WTRU may be provided. The first WTRU may comprise a processor. The processor may be configured to perform a number of actions. A first message may be received from a first relay WTRU. The first message may indicate a service provided by a second WTRU and a first measurement associated with a broadcast message sent by the second WTRU and received by the first relay WTRU. A second measurement may be determined. The second measurement may be associated with the first message received from the first relay WTRU. A second message may be sent to the first relay WTRU if the first measurement satisfies a first criteria for selecting a relay from a plurality of relays and the second measurement satisfies a second criteria for selecting the relay from the plurality of relays. The second message may comprise an indication to establish communication between the first WTRU and the second WTRU via the first relay WTRU.

In an example, the processor may be further configured to select the first relay WTRU as the relay from the plurality of relays if the first measurement satisfies the first criteria for selecting the relay from the plurality of relays and the second measurement satisfies the second criteria for selecting the relay from the plurality of relays.

In an example, at least the first criteria or the second criteria may comprise at least a minimum quality of a connection to the second WTRU, a maximum number of relays to be used to establish the communication between the first WTRU and the second WTRU, a maximum amount of latency for a connection, a maximum number of relays to reach a relay, a maximum number of relays to reach the second WTRU, a minimum signal strength, or a maximum traffic load.

In an example, the first measurement may indicate a first signal strength. The second measurement may indicate a second signal strength. The first measurement may satisfy the first criteria if the first signal strength is above a first threshold. The second measurement may satisfy the second criteria if the second signal strength is above a second threshold.

In an example, the first measurement may indicate a first latency associated with the broadcast message. The second measurement may indicate a second latency associated with the first message. The first measurement may satisfy the first criteria if the first latency is below a first threshold. The second measurement may satisfy the second criteria if the second latency is below a second threshold.

In an example, the first measurement may indicate a first latency associated with the broadcast message. The second measurement may indicate a second latency associated with the first message. The first measurement may satisfy the first criteria if the first latency is below a first threshold. The second measurement may satisfy the second criteria if a sum of the first latency and the second latency is below a second threshold.

In an example, the first measurement may indicate a number of relays associated with the broadcast message. The first measurement may satisfy the first criteria if the number of relays is below a threshold.

In an example, the first message may further comprise at least an indication of a mobility of one or more WTRUs, an indication of an availability schedule for the one or more WTRUs, or an indication of a location for the one or more WTRUs.

A first WTRU and/or a method performed by the first WTRU may be provided. The first WTRU may comprise a processor. The processor may be configured to perform a number of actions. A first message may be received from a first relay WTRU. The first message may indicate a service provided by a second WTRU and a combined measurement associated with a first measurement and a second measurement. The first measurement may be determined by the first relay WTRU. The second measurement may be determined by a second relay WTRU. A third measurement may be determined. The third measurement may be associated with the first message received from the first relay WTRU. A second message may be sent to the first relay WTRU if the combined measurement satisfies a first criteria for selecting a relay from a plurality of relays and the third measurement satisfies a second a criteria for selecting the relay from the plurality of relays. The second message may comprise an indication to receive data from the second WTRU via the first relay WTRU.

In an example, the processor is further configured to select the first relay WTRU as the relay from the plurality of relays if the combined measurement satisfies the first criteria and the third measurement satisfies the second criteria.

In an example, at least the first criteria or the second criteria may comprise at least a minimum quality of a connection to the service provider WTRU, a maximum number of relays to be used to establish a communication between the WTRU and the service provider WTRU, a maximum amount of latency for a connection, a maximum number of relays to reach a relay, a maximum number of relays to reach the service provider WTRU, a minimum signal strength, or a maximum traffic load.

In an example, the combined measurement may indicate a first signal strength associated with the first measurement and the second measurement. The third measurement may indicate a third signal strength. The combined measurement may satisfy the first criteria when the first signal strength is above a first threshold. The third measurement may satisfy the second criteria if the third signal strength is above a second threshold.

In an example, the combined measurement may be a latency summation of the first measurement and the second measurement. The third measurement may be a latency associated with the first message. The combined measurement may satisfy a first criteria when the combined measurement is below a first threshold. The third measurement may satisfy the second criteria if a sum of the combined measurement and the third measurement is below a second threshold.

In an example, the combined measurement may indicate a number of relays. The combined measurement may satisfy the first criteria if the number of relays is below a threshold.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well. For example, while the system has been described with reference to a 3GPP, 5G, and/or NR network layer, the envisioned embodiments extend beyond implementations using a particular network layer technology. Likewise, the potential implementations extend to all types of service layer architectures, systems, and embodiments. The techniques described herein may be applied independently and/or used in combination with other resource configuration techniques.

The processes described herein may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

It is understood that the entities performing the processes described herein may be logical entities that may be implemented in the form of software (e.g., computer-executable instructions) stored in a memory of, and executing on a processor of, a mobile device, network node or computer system. That is, the processes may be implemented in the form of software (e.g., computer-executable instructions) stored in a memory of a mobile device and/or network node, such as the node or computer system, which computer executable instructions, when executed by a processor of the node, perform the processes discussed. It is also understood that any transmitting and receiving processes illustrated in figures may be performed by communication circuitry of the node under control of the processor of the node and the computer-executable instructions (e.g., software) that it executes.

The various techniques described herein may be implemented in connection with hardware or software or, where appropriate, with a combination of both. Thus, the implementations and apparatus of the subject matter described herein, or certain aspects or portions thereof, may take the form of program code (e.g., instructions) embodied in tangible media including any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable devices, the computing device generally includes a processor, a storage medium readable by the processor (including volatile and non-volatile memory and/or storage elements), at least one input device, and at least one output device. One or more programs that may implement or utilize the processes described in connection with the subject matter described herein, for example, through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computing systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed:

1. A destination wireless transmit/receive unit (WTRU), the destination WTRU comprising:
    a processor, the processor configured to:
        receive a first message from a relay WTRU, wherein the first message indicates a service provided by a source WTRU, indicates a key performance indicator (KPI) that the relay WTRU supports for the service, and indicates a first measurement associated with a broadcast message sent by the source WTRU and received by the relay WTRU;
        determine a second measurement, wherein the second measurement is associated with the first message received from the relay WTRU;
        determine that a relay selection criterion is satisfied based on the first measurement, the second measurement, and the KPI; and
        send a second message to the relay WTRU when the relay selection criterion is satisfied, wherein the second message indicates a request for the service to be provided using a connection between the destination WTRU and the source WTRU via the relay WTRU.

2. The destination WTRU of claim 1, wherein the KPI is further supported by the source WTRU.

3. The destination WTRU of claim 1, wherein the KPI is a first KPI and wherein the processor is further configured to send a discovery message to the relay WTRU, wherein the discovery message indicates a second KPI.

4. The destination WTRU of claim 3, wherein at least the first KPI or the second KPI is at least one of a KPI supported by the destination WTRU, a minimum KPI the relay WTRU is to satisfy in supporting the service, a minimum KPI the source WTRU is to satisfy in providing the service, or a KPI to be satisfied by the service.

5. The destination WTRU of claim 1, wherein the first message comprises a connectivity matrix, and wherein the connectivity matrix comprises at least one of the KPI, a source WTRU capability, a relay WTRU capability, a service capability, the first measurement, the second measurement, the relay selection criterion, a source WTRU location, a relay WTRU location, a schedule of availability associated with the relay WTRU, a schedule of availability associated with the source WTRU, and a schedule of availability associated with the service.

6. The destination WTRU of claim 1, wherein the relay selection criterion comprises at least one of a minimum quality of a connection to the source WTRU, a maximum number of relays to be used to establish communication between the destination WTRU and the source WTRU, a maximum amount of latency for a connection, a maximum number of relays to reach the relay WTRU, a maximum number of relays to reach the source WTRU, a minimum signal strength, or a maximum traffic load.

7. The destination WTRU of claim 1, wherein the determination that the relay selection criterion is satisfied comprises determining that the KPI satisfies a minimum KPI requested by the destination WTRU.

8. The destination WTRU of claim 1, wherein the first measurement indicates a first latency associated with the broadcast message, wherein the second measurement indicates a second latency associated with the first message, and wherein the determination that the relay selection criterion is satisfied comprises determining that a sum of the first latency and the second latency is below a threshold.

9. A method performed by a destination wireless transmit/receive unit (WTRU), the method comprising:
 receiving a first message from a relay WTRU, wherein the first message indicates a service provided by a source WTRU, indicates a key performance indicator (KPI) that the relay WTRU supports for the service, and indicates a first measurement associated with a broadcast message sent by the source WTRU and received by the relay WTRU;
 determining a second measurement, wherein the second measurement is associated with the first message received from the relay WTRU;
 determining that a relay selection criterion is satisfied based on the first measurement, the second measurement, and the KPI; and
 sending a second message to the relay WTRU when the relay selection criterion is satisfied, wherein the second message indicates a request for the service to be provided using a connection between the destination WTRU and the source WTRU via the relay WTRU.

10. The method of claim 9, wherein the KPI is further supported by the source WTRU.

11. The method of claim 9, wherein the KPI is a first KPI and wherein the method further comprises sending a discovery message to the relay WTRU, wherein the discovery message indicates a second KPI.

12. The method of claim 11, wherein at least the first KPI or the second KPI is at least one of a KPI supported by the destination WTRU, a minimum KPI the relay WTRU is to satisfy in supporting the service, a minimum KPI the source WTRU is to satisfy in providing the service, or a KPI to be satisfied by the service.

13. The method of claim 9, wherein the first message comprises a connectivity matrix, and wherein the connectivity matrix comprises at least one of the KPI, a source WTRU capability, a relay WTRU capability, a service capability, the first measurement, the second measurement, the relay selection criterion, a source WTRU location, a relay WTRU location, a schedule of availability associated with the relay WTRU, a schedule of availability associated with the source WTRU, and a schedule of availability associated with the service.

14. The method of claim 9, wherein the relay selection criterion comprises at least one of a minimum quality of a connection to the source WTRU, a maximum number of relays to be used to establish communication between the destination WTRU and the source WTRU, a maximum amount of latency for a connection, a maximum number of relays to reach the relay WTRU, a maximum number of relays to reach the source WTRU, a minimum signal strength, or a maximum traffic load.

15. The method of claim 9, wherein the determination that the relay selection criterion is satisfied comprises determining that the KPI satisfies a minimum KPI requested by the destination WTRU.

16. The method of claim 9, wherein the first measurement indicates a first latency associated with the broadcast message, wherein the second measurement indicates a second latency associated with the first message, and wherein the determination that the relay selection criterion is satisfied comprises determining that a sum of the first latency and the second latency is below a threshold.

17. A destination wireless transmit-receive unit (WTRU), the destination WTRU comprising:
 a processor, the processor configured to:
  receive a first message from a first relay WTRU, wherein the first message indicates a service provided by a source WTRU and a combined measurement associated with a first measurement and a second measurement, wherein the first measurement is determined by the first relay WTRU, and wherein the second measurement is determined by a second relay WTRU;
  determine a third measurement, wherein the third measurement is associated with the first message received from the first relay WTRU; and
  send a second message to the first relay WTRU if the third measurement satisfies a first criterion for selecting the first relay and a sum of the third measurement and the combined measurement satisfies a second criterion for selecting the first relay WTRU, wherein the second message comprises an indication to receive data from the source WTRU via the first relay WTRU.

18. The destination WTRU of claim 17, wherein the first message further indicates a key performance indicator (KPI) that the first relay WTRU supports for the service, and wherein the second message is sent to the first relay WTRU if the KPI satisfies a third criterion for selecting the first relay WTRU.

19. The destination WTRU of claim 18, wherein the KPI is a first KPI and wherein the processor is further configured to send a discovery message to the first relay WTRU, wherein the discovery message indicates a second KPI.

20. The destination WTRU of claim 19, wherein at least the first KPI or the second KPI is at least one of a KPI supported by the destination WTRU, a minimum KPI the relay WTRU is to satisfy in supporting the service, a minimum KPI the source WTRU is to satisfy in providing the service, or a KPI to be satisfied by the service.

21. The destination WTRU of claim 17, wherein at least the first criterion or the second criterion comprises at least one of a minimum quality of a connection to source WTRU, a maximum number of relays to be used to establish a communication between the destination WTRU and the source WTRU, a maximum amount of latency for a connection, a maximum number of relays to reach a relay, a maximum number of relays to reach the source WTRU, a minimum signal strength, or a maximum traffic load.

22. The destination WTRU of claim 17, wherein the combined measurement indicates a first latency and a second latency, wherein the first latency is associated with a broadcast received by the second relay WTRU, wherein the second latency is associated with a relay message received by the first relay WTRU, wherein the third measurement satisfies the first criterion when the third measurement is below a first threshold, and wherein the sum of the third measurement and the combined measurement satisfies the second criterion if the sum of is below a second threshold.

23. The destination WTRU of claim 17, wherein the combined measurement indicates a first number of relays, wherein the third measurement indicates a second number of relays, wherein the third measurement satisfies the first criterion when the third measurement is below a first threshold, and wherein the sum of the third measurement and the combined measurement satisfies the second criterion if it is below a second threshold.

24. A method performed by a destination wireless transmit-receive unit (WTRU), the method comprising:
receiving a first message from a first relay WTRU, wherein the first message indicates a service provided by a source WTRU and a combined measurement associated with a first measurement and a second measurement, wherein the first measurement is determined by the first relay WTRU, and wherein the second measurement is determined by a second relay WTRU;
determining a third measurement, wherein the third measurement is associated with the first message received from the first relay WTRU; and
sending a second message to the first relay WTRU if the third measurement satisfies a first criterion for selecting the first relay WTRU and a sum of the third measurement and the combined measurement satisfies a second criterion for selecting the first relay WTRU, wherein the second message comprises an indication to receive data from the source WTRU via the first relay WTRU.

25. The method of claim 24, wherein the first message further indicates a key performance indicator (KPI) that the first relay WTRU supports for the service, and wherein the second message is sent to the first relay WTRU if the KPI satisfies a third criterion for selecting the first relay WTRU.

26. The method of claim 25, wherein the KPI is a first KPI, and wherein the method further comprises sending a discovery message to the first relay WTRU, wherein the discovery message indicates a second KPI.

27. The method of claim 26, wherein at least the first KPI or the second KPI is at least one of a KPI supported by the destination WTRU, a minimum KPI the first relay WTRU is to satisfy in supporting the service, a minimum KPI the source WTRU is to satisfy in providing the service, or a KPI to be satisfied by the service.

28. The method of claim 24, wherein at least the first criterion or the second criterion comprises at least one of a minimum quality of a connection to the source WTRU, a maximum number of relays to be used to establish a communication between the destination WTRU and the source WTRU, a maximum amount of latency for a connection, a maximum number of relays to reach a relay, a maximum number of relays to reach the source WTRU, a minimum signal strength, or a maximum traffic load.

29. The method of claim 24, wherein the combined measurement indicates a first latency and a second latency, wherein the first latency is associated with a broadcast received by the second relay WTRU, wherein the second latency is associated with a relay message received by the first relay WTRU, wherein the third measurement satisfies the first criterion when the third measurement is below a first threshold, and wherein the sum of the third measurement and the combined measurement satisfies the second criterion if the sum of is below a second threshold.

30. The method of claim 24, wherein the combined measurement indicates a first number of relays, wherein the third measurement indicates a second number of relays, wherein the third measurement satisfies the first criterion when the third measurement is below a first threshold, and wherein the sum of the third measurement and the combined measurement satisfies the second criterion if it is below a second threshold.

* * * * *